US012273800B2

(12) United States Patent
Xing

(10) Patent No.: US 12,273,800 B2
(45) Date of Patent: Apr. 8, 2025

(54) DESIGNATED FORWARDER ELECTION METHOD AND DEVICE

(71) Applicant: Huawei Technologies Co., Ltd., Shenzhen (CN)

(72) Inventor: Fei Xing, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 423 days.

(21) Appl. No.: 17/892,307

(22) Filed: Aug. 22, 2022

(65) Prior Publication Data

US 2022/0394590 A1 Dec. 8, 2022

Related U.S. Application Data

(63) Continuation of application No. PCT/CN2021/075362, filed on Feb. 4, 2021.

(30) Foreign Application Priority Data

Feb. 20, 2020 (CN) .......................... 202010105134.5

(51) Int. Cl.
*H04W 4/00* (2018.01)
*H04W 40/12* (2009.01)
(Continued)

(52) U.S. Cl.
CPC ........... *H04W 40/12* (2013.01); *H04W 40/20* (2013.01); *H04W 72/0453* (2013.01)

(58) Field of Classification Search
CPC . H04W 40/12; H04W 40/20; H04W 72/0453; H04W 28/04; H04W 72/04;
(Continued)

(56) References Cited

U.S. PATENT DOCUMENTS 9,923,781 B2 * 3/2018 Chalapathy ......... H04L 12/4641
11,546,267 B2 * 1/2023 Liu ..................... H04L 12/4641
(Continued)

FOREIGN PATENT DOCUMENTS

CN        101164265 A      4/2008
CN        107959610 A      4/2018
(Continued)

OTHER PUBLICATIONS

Malhotra, N. et al "Weighted Multi-Path Procedures for EVPN All-Active Multi-Homing;, draft-malhotra-bess-evpn-unequal-lb-04. txt", XP015127784, Jul. 17, 2018, 18 pages.
(Continued)

*Primary Examiner* — Phuongchau Ba Nguyen
(74) *Attorney, Agent, or Firm* — Conley Rose, P.C.

(57) ABSTRACT

A designated forwarder election method includes a first provider edge (PE) receiving a bandwidth notification message sent by another PE, where the first PE and the other PE are connected to a first customer edge (CE), and where the bandwidth notification message includes bandwidth information of a link between the other PE and the first CE. The first PE elects a DF from the first PE and the other PE based on the bandwidth information of the other PE and bandwidth information of a link between the first PE and the first CE.

16 Claims, 4 Drawing Sheets

(51) Int. Cl.
*H04W 40/20* (2009.01)
*H04W 72/0453* (2023.01)

(58) Field of Classification Search
CPC ... H04W 72/042; H04W 88/08; H04W 28/08; H04W 28/084; H04W 36/22; H04W 72/12; H04L 45/16; H04L 45/22; H04L 12/4641; H04L 45/06; H04L 47/122; H04L 47/125; H04L 47/806; H04L 47/822; H04L 41/40; H04L 41/0896; H04L 45/38; H04L 45/74; H04L 5/0007
See application file for complete search history.

(56) References Cited

U.S. PATENT DOCUMENTS

| | | |
|---|---|---|
| 2006/0209682 A1 | 9/2006 | Filsfils et al. |
| 2007/0133406 A1 | 6/2007 | Vasseur |
| 2018/0034665 A1* | 2/2018 | Nguyen .............. H04L 12/4641 |
| 2019/0166407 A1* | 5/2019 | Sajassi ................ H04L 12/4641 |
| 2020/0351186 A1 | 11/2020 | Mohanty et al. |

FOREIGN PATENT DOCUMENTS

| | | |
|---|---|---|
| CN | 110391987 A | 10/2019 |
| CN | 111083061 A | 4/2020 |

OTHER PUBLICATIONS

Liu, Yisong I et al., "Multicast DFElection for EVPN based on bandwidth or quantity; draft-liu-bess-evpn-mcast-bw-quantity-df-election-01.txt", XP015136699, Nov. 2019, 11 pages.

\* cited by examiner

DESIGNATED FORWARDER ELECTION METHOD AND DEVICE

CROSS-REFERENCE TO RELATED APPLICATIONS

This is a continuation of International Patent Application No. PCT/CN2021/075362 filed on Feb. 4, 2021, which claims priority to Chinese Patent Application No. 202010105134.5 filed on Feb. 20, 2020. The disclosures of the aforementioned applications are hereby incorporated by reference in their entireties.

TECHNICAL FIELD

This disclosure relates to the field of data communications technologies, and in particular, to a designated forwarder election method and device.

BACKGROUND

An Ethernet virtual private network (EVPN) is more widely used due to features such as separation of a control plane and a forwarding plane, flexible deployment, and wide application scenarios. In a multi-homing all-active scenario of an EVPN customer edge (CE), only one provider edge (PE) is needed to forward broadcast/unknown unicast/multicast (BUM) traffic to the CE. The elected PE is a designated forwarder (DF), and a process of electing the PE is a DF election process.

Currently, there are mainly the following two DF election solutions.

Solution 1: A DF is elected based on a source Internet Protocol (IP) address in Ethernet segment (ES) routing. PEs in a multi-homing scenario are sorted based on a sequence of source IP address sizes, sequence numbers starting from 0 are assigned to the PEs in sequence, and a PE with a sequence number 0 is elected from the PEs as the DF.

Solution 2: A DF is elected based on a virtual local area network (VLAN).

A sequence number of a PE serving as the DF is calculated according to a formula (V mod N)=i. In this formula, i indicates the sequence number of the PE, N indicates a quantity of PEs which a CE is multi-homed, and V indicates a VLAN ID of a VLAN corresponding to an ES.

However, the DF election processes in Solution 1 and Solution 2 may cause heavy load or even overload of traffic on a link.

SUMMARY

This disclosure provides a designated forwarder election method and device, to avoid a problem that a DF election method in other approaches causes heavy load or even overload of traffic on a link.

According to a first aspect, an embodiment of this disclosure provides a designated forwarder election method. The method includes: a first provider edge PE receives a bandwidth notification message sent by another PE, where the first PE and the other PE are connected to a first CE, and the bandwidth notification message includes bandwidth information of a link between the other PE and the first CE; and the first PE elects a designated forwarder DF from the first PE and the other PE based on the bandwidth information of the other PE and bandwidth information of a link between the first PE and the first CE.

Based on this solution, the DF may be elected, based on the bandwidth information of the links to the first CE, from the first PE and the other PE connected to the first CE, so that the DF election process considers the bandwidth information of the links and load on different links in a DF election result. This can avoid heavy load or even overload on the links.

In a possible implementation, that the first PE elects a DF from the first PE and the other PE based on the bandwidth information of the other PE and bandwidth information of a link between the first PE and the first CE includes: the first PE elects a PE with a largest available bandwidth or a highest available bandwidth rate from the first PE and the other PE as the DF; or the first PE elects a PE with a lowest used bandwidth rate from the first PE and the other PE as the DF; or the first PE elects, from the first PE and the other PE based on available bandwidths or available bandwidth rates of the other PE and the first PE, a DF used for different VLANs or different EVPN instances, where a DF with a larger available bandwidth or a higher available bandwidth rate is used for a larger quantity of VLANs or EVPNs; or the first PE elects, from the first PE and the other PE based on used bandwidth rates of the other PE and the first PE, a DF used for different VLANs or different EVPN instances, where a DF with a lower used bandwidth rate is used for a larger quantity of VLANs or EVPN instances. The available bandwidth, the available bandwidth rate, and the used bandwidth rate are determined based on the bandwidth information.

Based on this solution, an available bandwidth, an available bandwidth rate, or a used bandwidth rate of a PE may be considered during DF election, so that load on different links is considered in a DF election process. This can effectively avoid heavy load or even overload on the links.

In a possible implementation, that the first PE elects, from the first PE and the other PE based on available bandwidths or available bandwidth rates of the other PE and the first PE, a DF used for different VLANs or different EVPN instances includes: the first PE determines, from the first PE and the other PE based on a ratio between the available bandwidths or available bandwidth rates of the other PE and the first PE, a ratio between quantities of VLANs or EVPN instances for which PEs elected as DFs are separately used. Alternatively, that the first PE elects, from the first PE and the other PE based on used bandwidth rates of the other PE and the first PE, a DF used for different VLANs or different EVPN instances includes: the first PE determines, from the first PE and the other PE based on a ratio between the used bandwidth rates of the other PE and the first PE, a ratio between quantities of VLANs or EVPN instances for which PEs elected as DFs are separately used.

Based on this solution, when a DF to be used for a VLAN or an EVPN instance is elected, the DF may be elected based on a ratio between available bandwidths of PEs, a ratio between available bandwidth rates of PEs, or a ratio between used bandwidth rates of PEs, so that load of the elected DF is low. This can effectively avoid heavy load or even overload on a link.

In a possible implementation, the available bandwidth may be any one of the following: an average available bandwidth or a minimum available bandwidth.

Based on this solution, DF election may be performed based on an average available bandwidth or a minimum available bandwidth of a PE.

In a possible implementation, the available bandwidth rate may be any one of the following: an average available bandwidth rate or a minimum available bandwidth rate.

Based on this solution, DF election may be performed based on an average used bandwidth rate or a peak used bandwidth rate of a PE.

In a possible implementation, the used bandwidth rate may be any one of the following: an average used bandwidth rate or a peak used bandwidth rate.

Based on this solution, DF election may be performed based on an average used bandwidth rate or a peak used bandwidth rate of a PE.

In a possible implementation, the bandwidth notification message is a route update message.

Based on this solution, bandwidth information of a PE may be carried in a route update message of the PE, to reduce a quantity of information exchange times between PEs.

In a possible implementation, the bandwidth information includes a part or all of the following: a link bandwidth, an average used bandwidth, or a peak used bandwidth.

Based on this solution, an average used bandwidth rate, a peak used bandwidth rate, an average available bandwidth, and an average available bandwidth rate may be calculated based on bandwidth information of a PE for DF election.

In a possible implementation, after the first PE elects the DF from the first PE and the other PE based on the bandwidth information of the other PE and the bandwidth information of the link between the first PE and the first CE, the method further includes: re-electing a DF if a peak used bandwidth of the DF is greater than or equal to a first threshold; and/or re-electing a DF in each preset cycle; and/or re-electing a DF if a peak used bandwidth rate of the DF is greater than or equal to a second threshold; and/or re-electing a DF if an available bandwidth rate of the DF is less than or equal to a third threshold; and/or re-electing a DF if an available bandwidth of the DF is less than or equal to a fourth threshold.

Based on this solution, when load of the elected DF is high, a DF may be re-elected to avoid heavy load or overload of a link. Alternatively, a DF may be re-elected periodically, to further avoid heavy load or overload of a link.

In a possible implementation, the method further includes: stopping DF election if a DF election punishment value is greater than or equal to a punishment threshold, where the DF election punishment value is positively correlated with a quantity of DF election times and is negatively correlated with time; or resuming DF election if the DF election punishment value is less than the punishment threshold.

Based on this solution, when the quantity of DF election times is large, DF election may be suspended to avoid frequent DF adjustment.

According to a second aspect, an embodiment of this disclosure further provides a designated forwarder election device, including: a transceiver unit, configured to receive a bandwidth notification message sent by another provider edge PE, where the first PE and the other PE are connected to a first CE, and the bandwidth notification message includes bandwidth information of a link between the other PE and the first CE; and a processing unit, configured to elect a designated forwarder DF from the first PE and the other PE based on the bandwidth information of the other PE and bandwidth information of a link between the first PE and the first CE.

In a possible implementation, the processing unit is configured to: elect a PE with a largest available bandwidth or a highest available bandwidth rate from the first PE and the other PE as the DF; or elect a PE with a lowest used bandwidth rate from the first PE and the other PE as the DF; or elect, from the first PE and the other PE based on available bandwidths or available bandwidth rates of the other PE and the first PE, a DF used for different VLANs or different EVPN instances, where a DF with a larger available bandwidth or a higher available bandwidth rate is used for a larger quantity of VLANs or EVPNs; or elect, from the first PE and the other PE based on used bandwidth rates of the other PE and the first PE, a DF used for different VLANs or different EVPN instances, where a DF with a lower used bandwidth rate is used for a larger quantity of VLANs or EVPN instances. The available bandwidth, the available bandwidth rate, and the used bandwidth rate are determined based on the bandwidth information.

In a possible implementation, the processing unit is configured to: determine, from the first PE and the other PE based on a ratio between the available bandwidths or available bandwidth rates of the other PE and the first PE, a ratio between quantities of VLANs or EVPN instances for which PEs elected as DFs are separately used; or determine, from the first PE and the other PE based on a ratio between the used bandwidth rates of the other PE and the first PE, a ratio between quantities of VLANs or EVPN instances for which PEs elected as DFs are separately used.

In a possible implementation, the available bandwidth may be any one of the following: an average available bandwidth or a minimum available bandwidth.

In a possible implementation, the available bandwidth rate may be any one of the following: an average available bandwidth rate or a minimum available bandwidth rate.

In a possible implementation, the used bandwidth rate may be any one of the following: an average used bandwidth rate or a peak used bandwidth rate.

In a possible implementation, the bandwidth notification message is a route update message.

In a possible implementation, the bandwidth information includes a part or all of the following: a link bandwidth, an average used bandwidth, or a peak used bandwidth.

In a possible implementation, the processing unit is further configured to: after the DF is elected from the first PE and the other PE based on the bandwidth information of the other PE and the bandwidth information of the link between the first PE and the first CE, re-elect a DF if a peak used bandwidth of the DF is greater than or equal to a first threshold; and/or re-elect a DF in each preset cycle; and/or re-elect a DF if a peak used bandwidth rate of the DF is greater than or equal to a second threshold; and/or re-elect a DF if an available bandwidth rate of the DF is less than or equal to a third threshold; and/or re-elect a DF if an available bandwidth of the DF is less than or equal to a fourth threshold.

In a possible implementation, the processing unit is further configured to: stop DF election if a DF election punishment value is greater than or equal to a punishment threshold, where the DF election punishment value is positively correlated with a quantity of DF election times and is negatively correlated with time; or resume DF election if the DF election punishment value is less than the punishment threshold.

According to a third aspect, an embodiment of this disclosure further provides a designated forwarder election device, where the device may be configured to perform an operation in any one of the first aspect and the possible implementations of the first aspect. For example, the device may include a module or a unit configured to perform each operation in any one of the first aspect or the possible implementations of the first aspect. For example, the device includes a processing unit and a transceiver unit.

According to a fourth aspect, an embodiment of this disclosure further provides a chip system, including a processor, and optionally further including a memory. The memory is configured to store a computer program, and the processor is configured to invoke the computer program from the memory, and run the computer program, to enable a designated forwarder election device on which the chip system is installed to perform any method in any one of the first aspect or the possible implementations of the first aspect.

According to a fifth aspect, an embodiment of this disclosure provides a computer program product, and the computer program product includes computer program code. When the computer program code is run by a communications unit and a processing unit or a transceiver and a processor of a designated forwarder election device, the designated forwarder election device is enabled to perform any method in any one of the first aspect or the possible implementations of the first aspect.

According to a sixth aspect, an embodiment of this disclosure provides a computer-readable storage medium. The computer-readable storage medium stores a program, and the program enables a designated forwarder election device to perform any method in any one of the first aspect or the possible implementations of the first aspect.

It should be understood that a technical effect that may be achieved by any design in the second aspect to the sixth aspect is the same as a technical effect that may be achieved by a corresponding or same design in the first aspect. Details are not described herein again.

DESCRIPTION OF EMBODIMENTS

To make objectives, technical solutions, and advantages of this disclosure clearer, the following further describes this disclosure in detail with reference to accompanying drawings. A specific operation method in method embodiments may also be applied to a device embodiment or a system embodiment.

Figure 1:
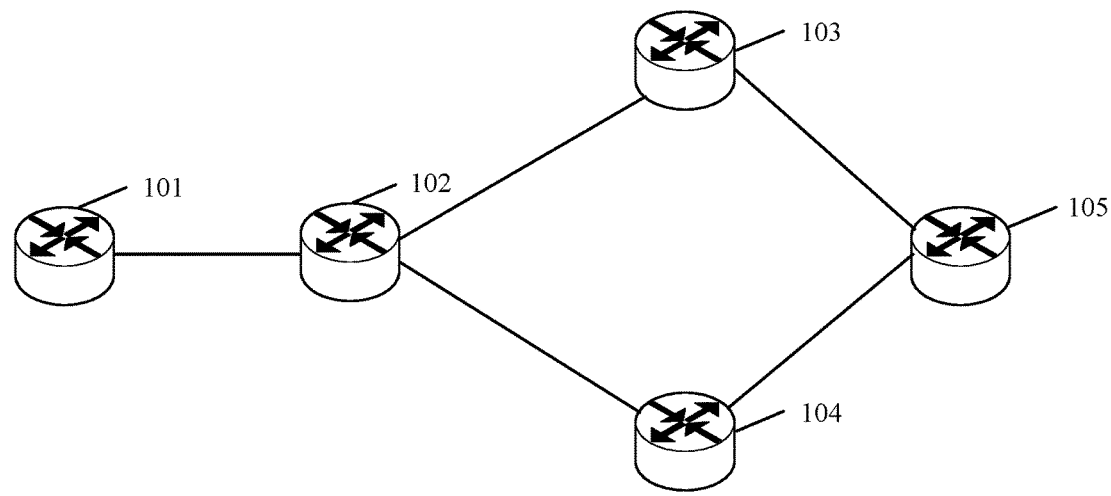
FIG. 1 is a schematic diagram of an application scenario of DF election according to this disclosure.

The technical solutions in embodiments of this disclosure may be applied to DF election in a CE dual-homing, multi-homing, or all-active scenario. The following uses a CE dual-homing scenario as an example for description without loss of generality. As shown in FIG. 1, a remote CE 101 is connected to a remote PE 102. A PE 1 (103) and a PE 2 (104) are connected to the remote PE 102. A CE 105 is dual-homed to the PE 1 (103) and the PE 2 (104). Only one of the PE 1 (103) and the PE 2 (104) is needed to forward BUM traffic to the CE 105. An elected PE for forwarding BUM traffic is referred to as a DF. A process of electing the PE is a DF election process.

The remote PE 102, the PE 1 (103), or the PE 2 (104) is also referred to as a PE router, may be an edge router of a service provider backbone network, and is equivalent to a label edge router. User traffic flows into a user network through a PE or flows into a Multiprotocol Label Switching (MPLS) backbone network through a PE.

The remote CE 101 or the CE 105 is also referred to as a CE router, and may be a customer end router. The CE is connected to one or more PEs, to provide service access for users. A CE router is usually an IP router and establishes an adjacency relationship with a connected PE.

In some deployments, the PE 1 (103) and the PE 2 (104) may further be connected to a controller, which is not shown in the figure. The controller may be a related component or server for obtaining link bandwidth information, and may include a Simple Network Management Protocol (SNMP) component/server, a netstream component/server, a telemetry component/server, a software defined network (SDN) controller, or the like.

Currently, there are mainly two DF election solutions. The following describes DF election methods in other approaches with reference to FIG. 2 and FIG. 3.

Figure 2:
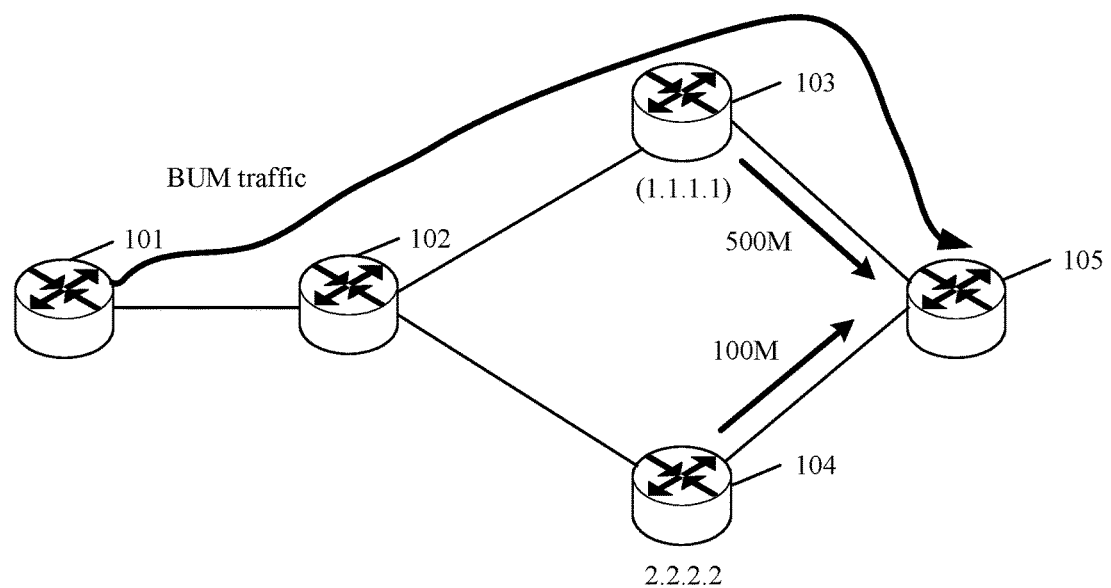
FIG. 2 is a schematic diagram of DF election in other approaches.

As shown in FIG. 2, there is 500 megabytes per a second (M) service traffic on a link between a PE 1 and a CE, and there is 100M service traffic on a link between a PE 2 and the CE. If a plurality of EVPN instances exists on a link, a DF needs to be elected for each EVPN instance. During DF election, the PE 1 with a smaller source IP address is elected from the PE 1 and the PE 2 as a DF. According to this DF election method, the PE 1 is always elected as a DF even if a plurality of EVPN instances exists on the link.

However, this election method may cause heavy load or even overload on a link of the PE 1.

Figure 3:
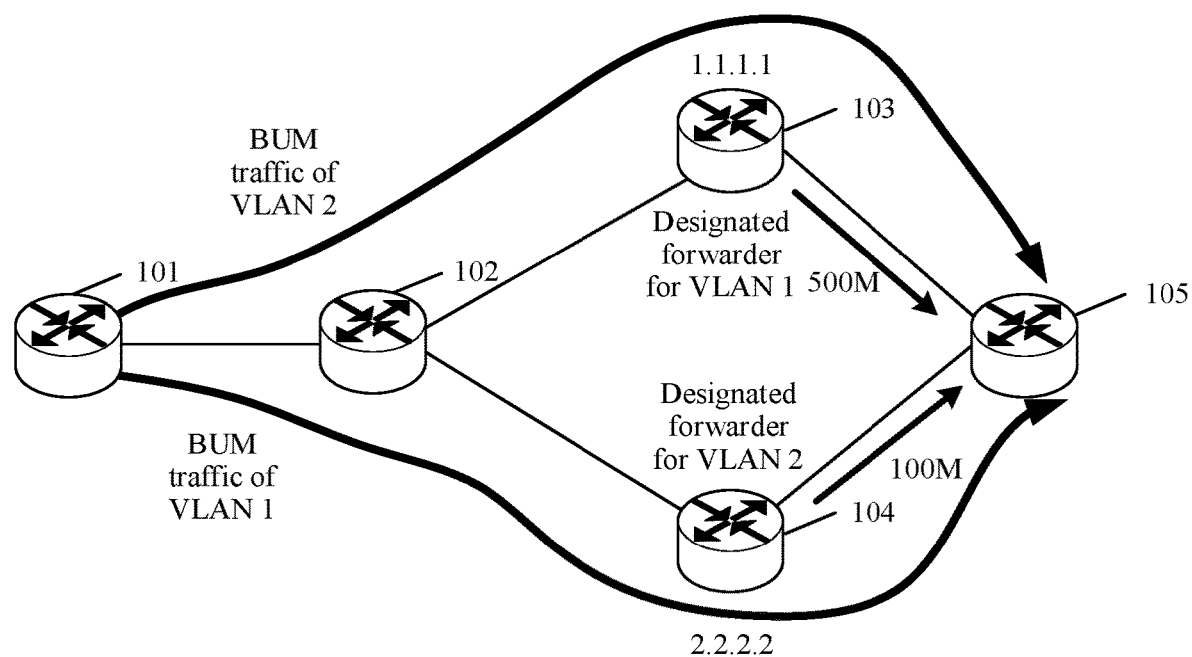
FIG. 3 is a schematic diagram of DF election in the other approaches.

As shown in FIG. 3, there are two VLANs between a CE and a PE 1 and between the CE and a PE 2. During DF election, a sequence number of a PE that functions as a DF is calculated according to formula (1):

$$(V \bmod N) = i \qquad \text{Formula (1)}$$

In this formula, i indicates the sequence number of the PE, N indicates a quantity of PEs multi-homed to a same CE, and V indicates a VLAN ID of a VLAN corresponding to an ES. According to the foregoing method, the PE 1 functions as a DF to forward BUM traffic of a VLAN 1, and the PE 2 forwards BUM traffic of a VLAN 2. However, this DF election method still does not consider an actual usage state of a link bandwidth and cannot completely avoid heavy load or even overload of traffic on a link.

For example, if there is 500M service traffic on a link between the PE 1 and the CE, and there is 100M service traffic on a link between the PE 2 and the CE, the PE 2 may function as a DF to forward BUM traffic of both the VLAN 1 and the VLAN 2, to avoid heavy load of the PE 1.

Based on the foregoing requirement, embodiments of this disclosure provide a designated forwarder election method to avoid heavy load or even overload of an elected DF. Without loss of generality, the following describes embodiments of this disclosure in detail by using an example in which a CE is dual-homed to PEs. It may be understood that, in a multi-homing or all-active scenario, a DF may be elected based on a same technical solution. This is not limited in this disclosure.

Figure 4:
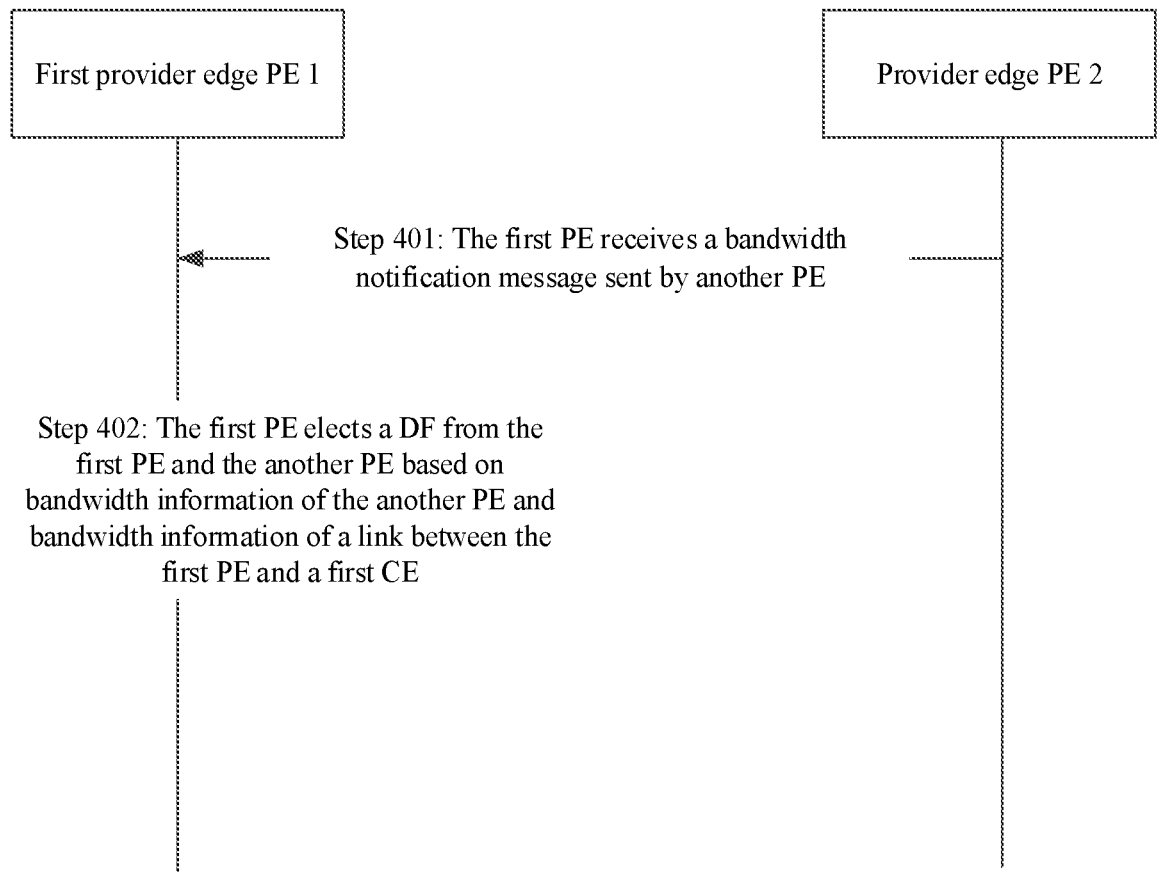
FIG. 4 is an example flowchart of a DF election method according to this disclosure.

FIG. 4 is an example flowchart of a designated forwarder election method according to an embodiment of this disclosure. As shown in FIG. 4, the method may include the following steps.

Step 401: A first PE receives a bandwidth notification message sent by another PE.

It should be understood that the first PE and the other PE herein are connected to a first CE. As shown in FIG. 1, the PE 103 may be the first PE, the PE 104 may be the other PE, and the CE 105 may be the first CE. The bandwidth notification message includes bandwidth information of a link between the other PE and the first CE. For example, the PE 104 sends a bandwidth notification message to the PE 103, where the bandwidth notification message includes bandwidth information of a link between the PE 104 and the CE 105; and the PE 103 may send a bandwidth notification message to the PE 104, where the bandwidth notification message includes bandwidth information of a link between the PE 103 and the CE 105.

In a possible implementation, the bandwidth notification message may be a newly added message, or may be an existing message. In an example, the bandwidth notification message may be a route update message. The bandwidth information may be carried in an undefined field of the route update message, or the bandwidth information may be carried in a newly added field of the route update message. Alternatively, the bandwidth notification message may be carried in the route update message.

The bandwidth notification message in this embodiment of this disclosure may include some or all of the following: a link bandwidth (LB), a cycle (Cyc), an average used bandwidth (average rate (AR)), or a peak used bandwidth (peak rate (PR)).

The average used bandwidth herein is an average used bandwidth within a cycle, and the peak used bandwidth may be a peak used bandwidth within a cycle. The cycle may be 10 seconds (s), 20 s, or the like, and may be preset according to an empirical value.

Step 402: The first PE elects a DF from the first PE and the other PE based on the bandwidth information of the other PE and bandwidth information of a link between the first PE and the first CE.

Without loss of generality, the following uses a scenario in which a CE is dual-homed to PEs as an example to explain in detail methods for electing the DF from the first PE and the other PE based on the bandwidth information. It should be noted that a same method may be used to elect a DF in a CE multi-homing or all-active scenario. In the scenario in which the CE is dual-homed to the PEs, the PEs connected to the CE include a PE 1 and a PE 2. Electing a DF for a VLAN or an EVPN instance from the PE 1 and the PE 2 includes the following method 1 to method 8.

Method 1: An average available bandwidth or an average available bandwidth rate of the first PE is compared with that of the other PE.

The average available bandwidth and the average available bandwidth rate may be calculated based on the link bandwidth and the average used bandwidth in the bandwidth information, that is, average available bandwidth=(link bandwidth−average used bandwidth), and average available bandwidth rate=(link bandwidth−average used bandwidth)/link bandwidth.

(1) A PE with a largest average available bandwidth is elected from the first PE and the other PE as the DF. For example, a DF for an EVPN 1 is elected from the PE 1 and the PE 2. The PE 1 receives a bandwidth notification message from the PE 2, a link bandwidth of the PE 2 is 1000M, and an average used bandwidth of the PE 2 is 500M. In bandwidth information of the PE 1, a link bandwidth is 1200M, and an average used bandwidth is 800M. It can be learned that an average available bandwidth of the PE 1 is 1200M−800M=400M, and an average available bandwidth of the PE 2 is 1000M−500M=500M. Therefore, the PE 2 is elected as the DF for the EVPN 1.

(2) A PE with a highest average available bandwidth rate is elected from the first PE and the other PE as the DF. For example, a DF for an EVPN 1 is elected from the PE 1 and the PE 2. The PE 1 receives a bandwidth notification message from the PE 2, a link bandwidth of the PE 2 is 1200M, and an average used bandwidth of the PE 2 is 400M. In bandwidth information of the PE 1, a link bandwidth is 1000M, and an average used bandwidth is 800M. It can be learned that an average available bandwidth rate of the PE 1 is (1000M−800M)/1000M=0.2, and an average available bandwidth rate of the PE 2 is (1200M−400M)/1200M=0.67. Therefore, the PE 2 is elected as the DF for the EVPN 1.

(3) A DF used for different VLANs or EVPN instances is elected from the first PE and the other PE based on the average available bandwidths of the other PE and the first PE.

In an example, a DF with a larger average available bandwidth is used for a larger quantity of VLANs or EVPN instances. For example, a DF for an EVPN 1, an EVPN 2, and an EVPN 3 is elected from the PE 1 and the PE 2. The PE 1 receives a bandwidth notification message from the PE 2, a link bandwidth of the PE 2 is 1000M, and an average used bandwidth of the PE 2 is 800M. In bandwidth information of the PE 1, a link bandwidth is 1300M, and an average used bandwidth is 700M. It can be learned that an average available bandwidth of the PE 1 is (1300M−700M)=600M, and an average available bandwidth of the PE 2 is (1000M−800M)=200M. In this case, the average available bandwidth of the PE 1 is greater than that of the PE 2. Therefore, the PE 1 may be elected as a DF for two EVPN instances in the three EVPN instances, for example, a DF for the EVPN 1 and the EVPN 2, and the PE 2 may be elected as a DF for the remaining one EVPN instance, for example, a DF for the EVPN 3.

Alternatively, the PE 1 may be elected as a DF for two EVPN instances in the three EVPN instances, some BUM traffic of the remaining one EVPN instance is forwarded by the PE 1, and the other BUM traffic of the remaining one EVPN instance is forwarded by the PE 2.

A ratio between quantities of VLANs or EVPN instances for which PEs elected as DFs are separately used may be further determined based on a ratio between the average available bandwidths of the other PE and the first PE. For example, a ratio between average available bandwidths of the PEs elected as the DFs may be determined as the ratio between the quantities of VLANs or EVPN instances for which the PEs are separately used. Alternatively, the ratio between the quantities of VLANs or EVPN instances for which the PEs are separately used may approximate to a ratio between average available bandwidths of the PEs.

For example, a DF for an EVPN 1, an EVPN 2, an EVPN 3, and an EVPN 4 is elected from the PE 1 and the PE 2. The PE 1 receives a bandwidth notification message from the PE 2, a link bandwidth of the PE 2 is 1100M, and an average used bandwidth of the PE 2 is 200M. In bandwidth information of the PE 1, a link bandwidth is 800M, and an average used bandwidth is 500M. In this case, an average available bandwidth of the PE 1 is (800M−500M)=300M, and an average available bandwidth of the PE 2 is (1100M−200M)=900M. A ratio of the average available bandwidth of the PE 1 to that of the PE 2 is 1:3, and a ratio between quantities of EVPN instances for which the PE 1 and the PE 2 are separately used is also 1:3. That is, the PE 1 is elected as a DF for one of the four EVPN instances, and the PE 2 is elected as a DF for the remaining three EVPN instances.

It should be noted that, if a total quantity of VLANs or EVPN instances cannot be evenly allocated to the PEs based on the ratio between the average available bandwidths of the PEs elected as the DFs, the ratio between the quantities of VLANs or EVPN instances for which the PEs are used may be made approximate to the ratio between the average available bandwidths of the PEs.

For example, if the ratio of the average available bandwidth of the PE 1 to that of the PE 2 is 1:3, and the total quantity of EVPN instances is 9, the PE 1 may be elected as a DF for two EVPN instances in the nine EVPN instances, and the PE 2 may be elected as a DF for the remaining seven EVPN instances.

(4) A DF used for different VLANs or EVPN instances is elected from the first PE and the other PE based on the average available bandwidth rates of the other PE and the first PE.

In an example, a DF with a higher average available bandwidth rate is used for a larger quantity of VLANs or EVPN instances. For example, a DF for an EVPN 1, an EVPN 2, and an EVPN 3 is elected from the PE 1 and the PE 2. The PE 1 receives a bandwidth notification message from the PE 2, a link bandwidth of the PE 2 is 1000M, and an average used bandwidth of the PE 2 is 800M. In bandwidth information of the PE 1, a link bandwidth is 1300M, and an average used bandwidth is 700M. It can be learned that an average available bandwidth rate of the PE 1 is (1300M−700M)/1300M=0.46, and an average available bandwidth rate of the PE 2 is (1000M−800M)/1000M=0.2. In this case, the average available bandwidth rate of the PE 1 is greater than that of the PE 2. Therefore, the PE 1 may be elected as a DF for two EVPN instances in the three EVPN instances, for example, a DF for the EVPN 1 and the EVPN 2, and the PE 2 may be elected as a DF for the remaining one EVPN instance, for example, a DF for the EVPN 3.

Alternatively, the PE 1 may be elected as a DF for two EVPN instances in the three EVPN instances, some BUM traffic of the remaining one EVPN instance is forwarded by the PE 1, and the other BUM traffic of the remaining one EVPN instance is forwarded by the PE 2.

A ratio between quantities of VLANs or EVPN instances for which PEs elected as DFs are separately used may be further determined based on a ratio between the average available bandwidth rates of the other PE and the first PE. For example, a ratio between average available bandwidth rates of the PEs elected as the DFs may be determined as the ratio between the quantities of VLANs or EVPN instances for which the PEs are separately used. Alternatively, the ratio between the quantities of VLANs or EVPN instances for which the PEs are separately used may approximate to a ratio between average available bandwidth rates of the PEs.

For example, a DF for an EVPN 1, an EVPN 2, and an EVPN 3 is elected from the PE 1 and the PE 2. The PE 1 receives a bandwidth notification message from the PE 2, a link bandwidth of the PE 2 is 1100M, and an average used bandwidth of the PE 2 is 200M. In bandwidth information of the PE 1, a link bandwidth is 800M, and an average used bandwidth is 500M. In this case, an average available bandwidth rate of the PE 1 is (800M−500M)/800M≈0.4, and an average available bandwidth rate of the PE 2 is (1100M−200M)/1100M≈0.8. A ratio of the average available bandwidth rate of the PE 1 to that of the PE 2 is 1:2, and a ratio between quantities of EVPN instances for which the PE 1 and the PE 2 are separately used is also 1:2. That is, the PE 1 is elected as a DF for one of the three EVPN instances, and the PE 2 is elected as a DF for the remaining two EVPN instances.

Method 2: A minimum available bandwidth or a minimum available bandwidth rate of the first PE is compared with that of the other PE.

The minimum available bandwidth and the minimum available bandwidth rate may be calculated based on the link bandwidth and the peak used bandwidth in the bandwidth information, that is, minimum available bandwidth=(link bandwidth−peak used bandwidth), and minimum available bandwidth rate=(link bandwidth−peak used bandwidth)/link bandwidth.

(1) A PE with a largest minimum available bandwidth is elected from the first PE and the other PE as the DF. For example, a DF for an EVPN 1 is elected from the PE 1 and the PE 2. The PE 1 receives a route update message from the PE 2, a link bandwidth of a link on which the PE 2 is located is 1000M, and a periodic link peak used bandwidth of the link on which the PE 2 is located is 450M. The PE 2 receives a route update message from the PE 1, a link bandwidth of a link on which the PE 1 is located is 1200M, and a periodic link peak used bandwidth of the link on which the PE 1 is located is 500M. It can be learned that a periodic link minimum available bandwidth of the PE 1 is 700M, and a periodic link minimum available bandwidth of the PE 2 is 550M. In this case, the PE 1 is elected as the DF for the EVPN 1.

(2) A PE with a highest minimum available bandwidth rate is elected from the first PE and the other PE as the DF. For example, a DF for an EVPN 1, an EVPN 2, and an EVPN 3 is elected from the PE 1 and the PE 2. The PE 1 receives a route update message from the PE 2, a link bandwidth of the PE 2 is 1000M, and a peak used bandwidth of the PE 2 is 200M. In bandwidth information of the PE 1, a link bandwidth is 1200M, and a peak used bandwidth is 500M. It can be learned that a minimum available bandwidth rate of the PE 1 is (1200M−500M)/1200M=0.58, and a minimum available bandwidth rate of the PE 2 is (1000M−200M)/1000M=0.8. Therefore, the PE 2 is elected as the DF for the EVPN 1, the EVPN 2, and the EVPN 3.

(3) A DF used for different VLANs or EVPN instances is elected from the first PE and the other PE based on the minimum available bandwidths of the other PE and the first PE.

In an example, a DF with a larger minimum available bandwidth is used for a larger quantity of VLANs or EVPN instances. For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1000M, and a peak used bandwidth of the PE 2 is 200M. In bandwidth information of the PE 1, a link bandwidth is 1200M, and a peak used bandwidth is 500M. It can be learned that a minimum available bandwidth of the PE 1 is (1200M−500M)=700M, and a minimum available bandwidth of the PE 2 is (1000M−200M)=800M. In this case, the minimum available bandwidth of the PE 1 is greater than that of the PE 2. Therefore, the PE 1 may be elected as a DF for two VLANs in the three VLANs, for example, a DF for the VLAN 1 and the VLAN 2, and the PE 2 may be elected as a DF for the remaining one VLAN, for example, a DF for the VLAN 3.

Alternatively, the PE 1 may be elected as a DF for two VLANs in the three VLANs, some BUM traffic of the remaining one VLAN is forwarded by the PE 1, and the other BUM traffic of the remaining one VLAN is forwarded by the PE 2.

A ratio between quantities of VLANs or EVPN instances for which PEs elected as DFs are separately used may be further determined based on a ratio between the minimum available bandwidths of the other PE and the first PE. For example, a ratio between minimum available bandwidths of the PEs elected as the DFs may be determined as the ratio between the quantities of VLANs or EVPN instances for which the PEs are separately used. Alternatively, the ratio between the quantities of VLANs or EVPN instances for which the PEs are separately used may approximate to a ratio between minimum available bandwidths of the PEs.

For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1100M, and a peak used bandwidth of the PE 2 is 800M. In bandwidth information of the PE 1, a link bandwidth is 1200M, and a peak used bandwidth is 600M. It can be learned that a minimum available bandwidth of the PE 1 is (1200M−600M)=600M, and a minimum available bandwidth of the PE 2 is (1100M−800M)=300M. A ratio of the minimum available bandwidth of the PE 1 to that of the PE 2 is 2:1, and then a ratio between quantities of VLANs that the PE 1 and the PE 2 separately serve may be 2:1. Therefore, the PE 1 may be elected as a DF for two VLANs in the three VLANs, and the PE 2 may be elected as a DF for the remaining one VLAN.

(4) A DF used for different VLANs or EVPN instances is elected from the first PE and the other PE based on the minimum available bandwidth rates of the other PE and the first PE.

In an example, a DF with a higher minimum available bandwidth rate is used for a larger quantity of VLANs or EVPN instances. For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1100M, and a peak used bandwidth of the PE 2 is 200M. In bandwidth information of the PE 1, a link bandwidth is 1200M, and a peak used bandwidth is 500M. It can be learned that a minimum available bandwidth rate of the PE 1 is (1200M−500M)/1200M=0.58, and a minimum available bandwidth rate of the PE 2 is (1100M−200M)/1100M=0.82. In this case, the minimum available bandwidth rate of the PE 2 is greater than the minimum available bandwidth rate of the PE 1. Therefore, the PE 2 may be elected as a DF for the three VLANs, or the PE 2 may be elected as a DF for two VLANs in the three VLANs, for example, a DF for the VLAN 1 and the VLAN 2, and the PE 1 may be elected as a DF for the remaining one VLAN, for example, a DF for the VLAN 3.

Alternatively, the PE 2 may be elected as a DF for two VLANs in the three VLANs, some BUM traffic of the remaining one VLAN is forwarded by the PE 1, and the other BUM traffic of the remaining one VLAN is forwarded by the PE 2.

A ratio between quantities of VLANs or EVPN instances for which PEs elected as DFs are separately used may be further determined based on a ratio between the minimum available bandwidth rates of the other PE and the first PE. For example, a ratio between minimum available bandwidth rates of the PEs elected as the DFs may be determined as the ratio between the quantities of VLANs or EVPN instances for which the PEs are separately used. Alternatively, the ratio between the quantities of VLANs or EVPN instances for which the PEs are separately used may approximate to a ratio between minimum available bandwidth rates of the PEs.

For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1000M, and a peak used bandwidth of the PE 2 is 600M. In bandwidth information of the PE 1, a link bandwidth is 1000M, and a peak used bandwidth is 800M. It can be learned that a minimum available bandwidth rate of the PE 1 is (1000M−800M)/1000M=0.2, and a minimum available bandwidth rate of the PE 2 is (1000M−600M)/1000M=0.4. In this case, a ratio of the minimum available bandwidth rate of the PE 1 to that of the PE 2 is 1:2, and then a ratio between quantities of VLANs that the PE 1 and the PE 2 separately serve may be 1:2. That is, the PE 1 may be elected as a DF for one VLAN in the three VLANs, and the PE 2 may be elected as a DF for the remaining two VLANs.

Method 3: An average used bandwidth or an average used bandwidth rate of the first PE is compared with that of the other PE.

The bandwidth information includes an average used bandwidth, and the average used bandwidth rate may be calculated based on the link bandwidth and the average used bandwidth, that is, average used bandwidth rate=average used bandwidth/link bandwidth.

(1) A PE with a smallest average used bandwidth is elected from the first PE and the other PE as the DF. For example, a DF for a VLAN 1 is elected from the PE 1 and the PE 2. The PE 1 receives a bandwidth notification message from the PE 2, and an average used bandwidth of the PE 2 is 500M. In bandwidth information of the PE 1, an average used bandwidth is 300M. The average used bandwidth of the PE 1 is less than the average used bandwidth of the PE 2. Therefore, the PE 1 is elected as the DF for the VLAN 1.

(2) A PE with a lowest average used bandwidth rate is elected from the first PE and the other PE as the DF. For example, a DF for a VLAN 1 and a VLAN 2 is elected from the PE 1 and the PE 2. The PE 1 receives a bandwidth notification message from the PE 2, a link bandwidth of the PE 2 is 1000M, and an average used bandwidth is 500M. In bandwidth information of the PE 1, a link bandwidth is 900M, and an average used bandwidth is 300M. It can be learned that an average used bandwidth rate of the PE 1 is 300M/900M=0.33, and an average used bandwidth rate of the PE 2 is 500M/1000M=0.5. The average used bandwidth rate of the PE 1 is lower than the average used bandwidth rate of the PE 2. Therefore, the PE 1 is elected as the DF for the VLAN 1 and the VLAN 2.

(3) A DF used for different VLANs or EVPN instances is elected from the first PE and the other PE based on the average used bandwidths of the other PE and the first PE.

In an example, a DF with a smaller average used bandwidth is used for a larger quantity of VLANs or EVPN instances. For example, a DF for a VLAN 1, a VLAN 2, and a VLAN 3 is elected from the PE 1 and the PE 2. The PE 1 receives a bandwidth notification message from the PE 2, and an average used bandwidth of the PE 2 is 800M. In bandwidth information of the PE 1, an average used bandwidth is 200M. Therefore, the PE 1 may be elected as a DF for two VLANs in the three VLANs, for example, a DF for the VLAN 1 and the VLAN 2, and the PE 2 may be elected as a DF for the remaining one VLAN, for example, a DF for the VLAN 3.

Alternatively, the PE 1 may be elected as a DF for two VLANs in the three VLANs, some BUM traffic of the remaining one VLAN is forwarded by the PE 1, and the other BUM traffic of the remaining one VLAN is forwarded by the PE 2.

A ratio between quantities of VLANs or EVPN instances for which PEs elected as DFs are separately used may be further determined based on a ratio between the average used bandwidths of the other PE and the first PE. For example, an opposite number of a ratio between average used bandwidths of the PEs may be determined as the ratio between the quantities of VLANs or EVPN instances for which the PEs elected as the DFs are separately used. Alternatively, an approximation value of an opposite number of a ratio between average used bandwidths of the PEs may be determined as the ratio between the quantities of VLANs or EVPN instances for which the PEs elected as the DFs are separately used.

For example, a DF for a VLAN 1, a VLAN 2, a VLAN 3, and a VLAN 4 is elected from the PE 1 and the PE 2. The PE 1 receives a bandwidth notification message from the PE 2, and an average used bandwidth of the PE 2 is 600M. In bandwidth information of the PE 1, an average used bandwidth is 200M. In this case, a ratio of the average used bandwidth of the PE 1 to the average used bandwidth of the PE 2 is 1:3, and therefore a ratio between quantities of VLANs that the PE 1 and the PE 2 separately serve may be 3:1. That is, the PE 1 is elected as a DF for three VLANs in the four VLANs, and the PE 2 is elected as a DF for the remaining one VLAN.

Alternatively, the PE 1 may be elected as a DF for two VLANs in the three VLANs, some BUM traffic of the remaining one VLAN is forwarded by the PE 1, and the other BUM traffic of the remaining one VLAN is forwarded by the PE 2.

(4) A DF used for different VLANs or EVPN instances is elected from the first PE and the other PE based on the average used bandwidth rates of the other PE and the first PE.

In an example, a DF with a lower average used bandwidth rate is used for a larger quantity of VLANs or EVPN instances. For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1000M, and an average used bandwidth of the PE 2 is 800M. In bandwidth information of the PE 1, a link bandwidth is 1000M, and an average used bandwidth is 200M. In this case, an average used bandwidth rate of the PE 1 is 200M/1000M=0.2, and an average used bandwidth rate of the PE 2 is 800M/1000M=0.8. Therefore, the PE 1 may be elected as a DF for two VLANs in the three VLANs, for example, a DF for the VLAN 1 and the VLAN 2, and the PE 2 may be elected as a DF for the remaining one VLAN, for example, a DF for the VLAN 3.

Alternatively, the PE 1 may be elected as a DF for two VLANs in the three VLANs, some BUM traffic of the remaining one VLAN is forwarded by the PE 1, and the other BUM traffic of the remaining one VLAN is forwarded by the PE 2.

A ratio between quantities of VLANs or EVPN instances for which PEs elected as DFs are separately used may be further determined based on a ratio between the average used bandwidth rates of the other PE and the first PE. For example, an opposite number of a ratio between average used bandwidth rates of the PEs may be determined as the ratio between the quantities of VLANs or EVPN instances for which the PEs elected as the DFs are separately used. Alternatively, an approximation value of an opposite number of a ratio between average used bandwidth rates of the PEs may be determined as the ratio between the quantities of VLANs or EVPN instances for which the PEs elected as the DFs are separately used.

For example, a DF for a VLAN 1, a VLAN 2, a VLAN 3, a VLAN 4, and a VLAN 5 is elected from the PE 1 and the PE 2. The PE 1 receives a bandwidth notification message from the PE 2, a link bandwidth of the PE 2 is 1000M, and an average used bandwidth of the PE 2 is 800M. In bandwidth information of the PE 1, a link bandwidth is 1000M, and an average used bandwidth is 200M. In this case, an average used bandwidth rate of the PE 1 is 200M/1000M=0.2, and an average used bandwidth rate of the PE 2 is 800M/1000M=0.8. In this case, a ratio of the average used bandwidth rate of the PE 1 to the average used bandwidth rate of the PE 2 is 1:4, and therefore a ratio between quantities of VLANs that the PE 1 and the PE 2 separately serve may be 4:1. That is, the PE 1 is elected as a DF for four VLANs in the five VLANs, and the PE 2 is elected as a DF for the remaining one VLAN.

Method 4: A peak used bandwidth or a peak used bandwidth rate of the first PE is compared with that of the other PE.

The bandwidth information includes a peak used bandwidth, and the peak used bandwidth rate may be calculated based on the link bandwidth and the peak used bandwidth, that is, peak used bandwidth rate=peak used bandwidth/link bandwidth.

(1) A PE with a smallest peak used bandwidth is elected from the first PE and the other PE as the DF. For example, a DF for a VLAN 1 is elected from the PE 1 and the PE 2. The PE 1 receives a bandwidth notification message from the PE 2, and a peak used bandwidth of the PE 2 is 1200M. In bandwidth information of the PE 1, a peak used bandwidth is 800M. In this case, the PE 1 may be elected as the DF for the VLAN 1.

(2) A PE with a lowest peak used bandwidth rate is elected from the first PE and the other PE as the DF. For example, a DF for a VLAN 1 is elected from the PE 1 and the PE 2. The PE 1 receives a bandwidth notification message from the PE 2, a link bandwidth of the PE 2 is 1200M, and a peak used bandwidth of the PE 2 is 1200M. In bandwidth information of the PE 1, a link bandwidth is 1000M, and a peak used bandwidth is 800M. It can be learned that a peak used bandwidth rate of the PE 1 is 800M/1000M=0.8, and a peak used bandwidth rate of the PE 2 is 1200M/1200M=1. Therefore, the PE 1 may be elected as the DF for the VLAN 1.

(3) A DF used for different VLANs or EVPN instances is elected from the first PE and the other PE based on the peak used bandwidths of the other PE and the first PE.

In an example, a DF with a smaller peak used bandwidth is used for a larger quantity of VLANs or EVPN instances. For example, a DF for a VLAN 1, a VLAN 2, and a VLAN 3 is elected from the PE 1 and the PE 2. The PE 1 receives a bandwidth notification message from the PE 2, and a peak used bandwidth of the PE 2 is 800M. In bandwidth information of the PE 1, a peak used bandwidth is 200M. Therefore, the PE 1 may be elected as a DF for two VLANs in the three VLANs, for example, a DF for the VLAN 1 and the VLAN 2, and the PE 2 may be elected as a DF for the remaining one VLAN, for example, a DF for the VLAN 3.

Alternatively, the PE 1 may be elected as a DF for two VLANs in the three VLANs, some BUM traffic of the remaining one VLAN is forwarded by the PE 1, and the other BUM traffic of the remaining one VLAN is forwarded by the PE 2.

A ratio between quantities of VLANs or EVPN instances for which PEs elected as DFs are separately used may be further determined based on a ratio between the peak used bandwidths of the other PE and the first PE. For example, an opposite number of a ratio between peak used bandwidths of the PEs may be determined as the ratio between the quantities of VLANs or EVPN instances for which the PEs elected as the DFs are separately used. Alternatively, an approximation value of an opposite number of a ratio between peak used bandwidths of the PEs may be determined as the ratio between the quantities of VLANs or EVPN instances for which the PEs elected as the DFs are separately used.

For example, a DF for a VLAN 1, a VLAN 2, and a VLAN 3 is elected from the PE 1 and the PE 2. The PE 1 receives a bandwidth notification message from the PE 2, and a peak used bandwidth of the PE 2 is 400M. In bandwidth information of the PE 1, a peak used bandwidth is 200M. In this case, a ratio of the peak used bandwidth of the PE 1 to the peak used bandwidth of the PE 2 is 1:2, and therefore a ratio between quantities of VLANs that the PE 1 and the PE 2 separately serve may be 2:1. That is, the PE 1 is elected as a DF for two VLANs in the three VLANs, and the PE 2 is elected as a DF for the remaining one VLAN.

(4) A DF used for different VLANs or EVPN instances is elected from the first PE and the other PE based on the peak used bandwidth rates of the other PE and the first PE.

In an example, a DF with a lower peak used bandwidth rate is used for a larger quantity of VLANs or EVPN instances. For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1000M, and a peak used bandwidth of the PE 2 is 800M. In bandwidth information of the PE 1, a link bandwidth is 1000M, and a peak used bandwidth is 200M. It can be learned that a peak used bandwidth rate of the PE 1 is 200M/1000M=0.2, and a peak used bandwidth rate of the PE 2 is 800M/1000M=0.8. Therefore, the PE 1 may be elected as a DF for the three VLANs, or the PE 1 may be elected as a DF for two VLANs in the three VLANs, for example, a DF for the VLAN 1 and the VLAN 2, and the PE 2 may be elected as a DF for the remaining one VLAN, for example, a DF for the VLAN 3.

Alternatively, the PE 1 may be elected as a DF for two VLANs in the three VLANs, some BUM traffic of the remaining one VLAN is forwarded by the PE 1, and the other BUM traffic of the remaining one VLAN is forwarded by the PE 2.

A ratio between quantities of VLANs or EVPN instances for which PEs elected as DFs are separately used may be further determined based on a ratio between the peak used bandwidth rates of the other PE and the first PE. For example, an opposite number of a ratio between peak used bandwidth rates of the PEs may be determined as the ratio between the quantities of VLANs or EVPN instances for which the PEs elected as the DFs are separately used. Alternatively, an approximation value of an opposite number of a ratio between peak used bandwidth rates of the PEs may be determined as the ratio between the quantities of VLANs or EVPN instances for which the PEs elected as the DFs are separately used.

For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1000M, and a peak used bandwidth of the PE 2 is 400M. In bandwidth information of the PE 1, a link bandwidth is 1000M, and a peak used bandwidth is 200M. It can be learned that a peak used bandwidth rate of the PE 1 is 200M/1000M=0.2, and a peak used bandwidth rate of the PE 2 is 400M/1000M=0.4. In this case, a ratio of the peak used bandwidth rate of the PE 1 to the peak used bandwidth rate of the PE 2 is 1:2, and therefore a ratio between quantities of VLANs that the PE 1 and the PE 2 separately serve may be 2:1. That is, the PE 1 is elected as a DF for two VLANs in the three VLANs, and the PE 2 is elected as a DF for the remaining one VLAN.

Method 5: Average available bandwidths and minimum available bandwidths of the first PE and the other PE are used as a reference.

In a possible implementation, a reference value may be calculated based on weights of the average available bandwidth and the minimum available bandwidth. The weights of the average available bandwidth and the minimum available bandwidth may be determined in advance according to empirical values. This is not limited in this disclosure.

(1) A PE with a largest reference value is elected from the first PE and the other PE as the DF. For example, a DF for an EVPN 1 is elected from the PE 1 and the PE 2. The PE 1 receives a bandwidth notification message from the PE 2, a link bandwidth of the PE 2 is 1500M, an average used bandwidth of the PE 2 is 400M, and a peak used bandwidth of the PE 2 is 800M. In bandwidth information of the PE 1, a link bandwidth is 800M, an average used bandwidth is 450M, and a peak used bandwidth is 700M. It can be learned that an average available bandwidth of the PE 1 is (800M−450M)=350M, a minimum available bandwidth of the PE 1 is (800M−700M)=100M, an average available bandwidth of the PE 2 is (1500M−400M)=1100M, and a minimum available bandwidth of the PE 2 is (1500M−800M)=700M. The weight of the average available bandwidth is 0.6, and the weight of the minimum available bandwidth is 0.4. Therefore, it can be learned through calculation that a reference value of the PE 1 is 350×0.6+100×0.4=250, and a reference value of the PE 2 is 1100×0.6+700×0.4=940. Therefore, the PE 2 may be elected as the DF for the EVPN 1.

(2) A DF used for different VLANs or EVPN instances is elected from the first PE and the other PE based on reference values of the other PE and the first PE.

In an example, a DF with a larger reference value is used for a larger quantity of VLANs or EVPN instances. For example, a DF for an EVPN 1, an EVPN 2, and an EVPN 3 is elected from the PE 1 and the PE 2. The PE 1 receives a bandwidth notification message from the PE 2, a link bandwidth of the PE 2 is 1500M, an average used bandwidth of the PE 2 is 400M, and a peak used bandwidth of the PE 2 is 800M. In bandwidth information of the PE 1, a link bandwidth is 800M, an average used bandwidth is 450M, and a peak used bandwidth is 700M. It can be learned that an average available bandwidth of the PE 1 is (800M−450M)=350M, a minimum available bandwidth of the PE 1 is (800M−700M)=100M, an average available bandwidth of the PE 2 is (1500M−400M)=1100M, and a minimum available bandwidth of the PE 2 is (1500M−800M)=700M. The weight of the average used bandwidth is 0.6, and the weight of the minimum available bandwidth is 0.4. Therefore, it can be learned through calculation that a reference value of the PE 1 is 350×0.6+100×0.4=250, and a reference value of the PE 2 is 1100×0.6+700×0.4=940. The reference value of the PE 2 is greater than that of the PE 1. Therefore, the PE 2 may be elected as a DF for two EVPN instances in the three EVPN instances, for example, a DF for the EVPN 1 and the EVPN 2, and the PE 1 may be elected as a DF for the remaining one EVPN instance, for example, a DF for the EVPN 3.

Alternatively, the PE 2 may be elected as a DF for two EVPN instances in the three EVPN instances, some BUM traffic of the remaining one EVPN instance is forwarded by the PE 1, and the other BUM traffic of the remaining one EVPN instance is forwarded by the PE 2.

A ratio between quantities of VLANs or EVPN instances for which PEs elected as DFs are separately used may be further determined based on a ratio between the reference values of the other PE and the first PE. For example, a ratio between reference values of the PEs elected as the DFs may be determined as the ratio between the quantities of VLANs or EVPN instances for which the PEs are separately used. Alternatively, the ratio between the quantities of VLANs or EVPN instances for which the PEs are separately used may approximate to a ratio between reference values of the PEs.

For example, a DF for an EVPN 1, an EVPN 2, an EVPN 3, and an EVPN 4 is elected from the PE 1 and the PE 2. The PE 1 receives a bandwidth notification message from the PE 2, a link bandwidth of the PE 2 is 1000M, an average used bandwidth of the PE 2 is 400M, and a peak used bandwidth of the PE 2 is 800M. In bandwidth information of the PE 1, a link bandwidth is 1000M, an average used bandwidth is 400M, and a peak used bandwidth is 800M. It can be learned that an average available bandwidth of the PE 1 is (1000M−400M)=600M, a minimum available bandwidth of the PE 1 is (1000M−800M)=200M, an average available bandwidth of the PE 2 is (1000M−400M)=600M, and a minimum available bandwidth of the PE 2 is (1000M−800M)=200M. The weight of the average used bandwidth is 0.6, and the weight of the minimum available bandwidth is 0.4. Therefore, it can be learned through calculation that a reference value of the PE 1 is 600×0.6+200×0.4=440, and a reference value of the PE 2 is 600×0.6+200×0.4=440. A ratio of the reference value of the PE 1 to the reference value of the PE 2 is approximately 1:1, and therefore a ratio between quantities of EVPN instances that the PE 1 and the PE 2 separately serve may be 1:1. That is, the PE 1 may be elected as a DF for two EVPN instances in the four EVPN instances, and the PE 2 may be elected as a DF for the remaining two EVPN instances.

Method 6: Average available bandwidth rates and minimum available bandwidth rates of the first PE and the other PE are used as a reference.

In a possible implementation, a reference value may be calculated based on weights of the average available bandwidth rate and the minimum available bandwidth rate. The weights of the average available bandwidth rate and the minimum available bandwidth rate may be determined in advance according to empirical values. This is not limited in this disclosure.

(1) A PE with a largest reference value is elected from the first PE and the other PE as the DF. For example, a DF for an EVPN 1 is elected from the PE 1 and the PE 2. The PE 1 receives a bandwidth notification message from the PE 2, a link bandwidth of the PE 2 is 1500M, an average used bandwidth of the PE 2 is 400M, and a peak used bandwidth of the PE 2 is 800M. In bandwidth information of the PE 1, a link bandwidth is 800M, an average used bandwidth is 450M, and a peak used bandwidth is 700M. It can be learned that an average available bandwidth rate of the PE 1 is (800M−450M)/800M=0.4375, a minimum available bandwidth rate of the PE 1 is (800M−700M)/800M=0.125, an average available bandwidth rate of the PE 2 is (1500M−400M)/1500M=0.73, and a minimum available bandwidth rate of the PE 2 is (1500M−800M)/1500M=0.47. The weight of the average used bandwidth rate is 0.6, and the weight of the minimum available bandwidth rate is 0.4. Therefore, it can be learned through calculation that a reference value of the PE 1 is 0.4375×0.6+0.125×0.4=0.3125, and a reference value of the PE 2 is 0.73×0.6+0.47×0.4=0.626. Therefore, the PE 2 may be elected as the DF for the EVPN 1.

(2) A DF used for different VLANs or EVPN instances is elected from the first PE and the other PE based on reference values of the other PE and the first PE.

In an example, a DF with a larger reference value is used for a larger quantity of VLANs or EVPN instances. For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1500M, an average used bandwidth of the PE 2 is 400M, and a peak used bandwidth of the PE 2 is 800M. In a bandwidth notification message from the PE 1, a link bandwidth is 800M, an average used bandwidth is 450M, and a peak used bandwidth is 700M. It can be learned that an average available bandwidth rate of the PE 1 is (800M−450M)/800M=0.4375, a minimum available bandwidth rate of the PE 1 is (800M−700M)/800M=0.125, an average available bandwidth rate of the PE 2 is (1500M−400M)/1500M=0.73, and a minimum available bandwidth rate of the PE 2 is (1500M−800M)/1500M=0.47. The weight of the average used bandwidth rate is 0.6, and the weight of the minimum available bandwidth rate is 0.4. Therefore, it can be learned through calculation that a reference value of the PE 1 is 0.4375×0.6+0.125×0.4=0.3125, and a reference value of the PE 2 is 0.73×0.6+0.47×0.4=0.626. The reference value of the PE 2 is greater than that of the PE 1. Therefore, the PE 2 may be elected as a DF for two VLANs in the three VLANs, and the PE 1 may be elected as a DF for the remaining one VLAN.

Alternatively, the PE 2 may be elected as a DF for two VLANs in the three VLANs, some BUM traffic of the remaining one VLAN is forwarded by the PE 1, and the other BUM traffic of the remaining one VLAN is forwarded by the PE 2.

A ratio between quantities of VLANs or EVPN instances for which PEs elected as DFs are separately used may be further determined based on a ratio between the reference values of the other PE and the first PE. For example, a ratio between reference values of the PEs elected as the DFs may be determined as the ratio between the quantities of VLANs or EVPN instances for which the PEs are separately used. Alternatively, the ratio between the quantities of VLANs or EVPN instances for which the PEs are separately used may approximate to a ratio between reference values of the PEs.

For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1500M, an average used bandwidth of the PE 2 is 400M, and a peak used bandwidth of the PE 2 is 800M. In a bandwidth notification message from the PE 1, a link bandwidth is 800M, an average used bandwidth is 450M, and a peak used bandwidth is 700M. It can be learned that an average available bandwidth rate of the PE 1 is (800M−450M)/800M=0.4375, a minimum available bandwidth rate of the PE 1 is (800M−700M)/800M=0.125, an average available bandwidth rate of the PE 2 is (1500M−400M)/1500M=0.73, and a minimum available bandwidth rate of the PE 2 is (1500M−800M)/1500M=0.47. The weight of the average used bandwidth rate is 0.6, and the weight of the minimum available bandwidth rate is 0.4. Therefore, it can be learned through calculation that a reference value of the PE 1 is 0.4375×0.6+0.125×0.4=0.3125, and a reference value of the PE 2 is 0.73×0.6+0.47×0.4=0.626. A ratio of the reference value of the PE 2 to the reference value of the PE 1 is approximately 2:1, and therefore a ratio between quantities of VLANs that the PE 1 and the PE 2 separately serve may be 2:1. That is, the PE 2 may be elected as a DF for two VLANs in the three VLANs, and the PE 1 may be elected as a DF for the remaining one VLAN.

Method 7: Average used bandwidths and peak used bandwidths of the first PE and the other PE are used as a reference.

In a possible implementation, a reference value may be calculated based on weights of the average used bandwidth and the peak used bandwidth. The weights of the average used bandwidth and the peak used bandwidth may be determined in advance according to empirical values. This is not limited in this disclosure.

(1) A PE with a smallest reference value is elected from the first PE and the other PE as the DF. For example, a DF for a VLAN 1 is elected from the PE 1 and the PE 2. The PE 1 receives a bandwidth notification message from the PE 2, an average used bandwidth of the PE 2 is 400M, and a peak used bandwidth of the PE 2 is 800M. In bandwidth information of the PE 1, an average used bandwidth is 450M, and a peak used bandwidth is 700M. The weight of the average used bandwidth is 0.8, and the weight of the peak used bandwidth is 0.2. Therefore, it can be learned through calculation that a reference value of the PE 1 is 450×0.8+700×0.2=500, and a reference value of the PE 2 is 400×0.8+800×0.2=480. Therefore, the PE 2 may be elected as the DF for the VLAN 1.

(2) A DF used for different VLANs or EVPN instances is elected from the first PE and the other PE based on reference values of the first PE and the other PE.

In an example, a DF with a smaller reference value is used for a larger quantity of VLANs or EVPN instances. For example, a DF for a VLAN 1, a VLAN 2, and a VLAN 3 is elected from the PE 1 and the PE 2. The PE 1 receives a bandwidth notification message from the PE 2, an average used bandwidth of the PE 2 is 400M, and a peak used bandwidth of the PE 2 is 800M. In bandwidth information of the PE 1, an average used bandwidth is 450M, and a peak used bandwidth is 700M. The weight of the average used bandwidth is 0.8, and the weight of the peak used bandwidth is 0.2. Therefore, it can be learned through calculation that a reference value of the PE 1 is 450×0.8+700×0.2=500, and a reference value of the PE 2 is 400×0.8+800×0.2=480. The reference value of the PE 2 is less than that of the PE 1. Therefore, the PE 2 may be elected as a DF for two VLANs in the three VLANs, and the PE 1 may be elected as a DF for the remaining one VLAN.

Alternatively, the PE 2 may be elected as a DF for two VLANs in the three VLANs, some BUM traffic of the remaining one VLAN is forwarded by the PE 1, and the other BUM traffic of the remaining one VLAN is forwarded by the PE 2.

A ratio between quantities of VLANs or EVPN instances for which PEs elected as DFs are separately used may be further determined based on a ratio between the reference values of the other PE and the first PE. For example, an opposite number of a ratio between reference values of the PEs may be determined as the ratio between the quantities of VLANs or EVPN instances for which the PEs elected as the DFs are separately used. Alternatively, an approximation value of an opposite number of a ratio between reference values of the PEs may be determined as the ratio between the quantities of VLANs or EVPN instances for which the PEs elected as the DFs are separately used.

For example, a DF for a VLAN 1 and a VLAN 2 is elected from the PE 1 and the PE 2. The PE 1 receives a bandwidth notification message from the PE 2, an average used bandwidth of the PE 2 is 400M, and a peak used bandwidth of the PE 2 is 800M. In bandwidth information of the PE 1, an average used bandwidth is 450M, and a peak used bandwidth is 700M. The weight of the average used bandwidth is 0.8, and the weight of the peak used bandwidth is 0.2. Therefore, it can be learned through calculation that a reference value of the PE 1 is 450×0.8+700×0.2=500, and a reference value of the PE 2 is 400×0.8+800×0.2=480. A ratio of the reference value of the PE 1 to the reference value of the PE 2 is approximately 1:1, and therefore a ratio between quantities of VLANs that the PE 1 and the PE 2 separately serve may be 1:1. That is, the PE 1 may be elected as a DF for one VLAN in the two VLANs, and the PE 2 may be elected as a DF for the remaining one VLAN.

Method 8: Average used bandwidth rates and peak used bandwidth rates of the first PE and the other PE are used as a reference.

In a possible implementation, a reference value may be calculated based on weights of the average used bandwidth rate and the peak used bandwidth rate. The weights of the average used bandwidth rate and the peak used bandwidth rate may be determined in advance according to empirical values. This is not limited in this disclosure.

(1) A PE with a smallest reference value is elected from the first PE and the other PE as the DF. For example, a DF for an EVPN 1 is elected from the PE 1 and the PE 2. The PE 1 receives a bandwidth notification message from the PE 2, a link bandwidth of the PE 2 is 1500M, an average used bandwidth of the PE 2 is 400M, and a peak used bandwidth of the PE 2 is 800M. In bandwidth information of the PE 1, a link bandwidth is 800M, an average used bandwidth is 450M, and a peak used bandwidth is 700M. It can be learned that an average used bandwidth rate of the PE 1 is 450M/800M=0.5625, and a peak used bandwidth rate of the PE 1 is 700M/800M=0.875. An average used bandwidth rate of the PE 2 is 400M/1500M=0.27, and a peak used bandwidth rate of the PE 2 is 800M/1500M=0.53. The weight of the average used bandwidth rate is 0.7, and the weight of the peak used bandwidth rate is 0.3. Therefore, it can be learned through calculation that a reference value of the PE 1 is 0.5675×0.7+0.875×0.3=0.66, and a reference value of the PE 2 is 0.27×0.7+0.53×0.3=0.35. The reference value of the PE 2 is greater than that of the PE 1. Therefore, the PE 2 may be elected as the DF for the EVPN 1.

(2) A DF used for different VLANs or EVPN instances is elected from the first PE and the other PE based on reference values of the first PE and the other PE.

In an example, a DF with a smaller reference value is used for a larger quantity of VLANs or EVPN instances. For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1500M, an average used bandwidth of the PE 2 is 400M, and a peak used bandwidth of the PE 2 is 800M. In bandwidth information of the PE 1, a link bandwidth is 800M, an average used bandwidth is 450M, and a peak used bandwidth is 700M. It can be learned that an average used bandwidth rate of the PE 1 is 450M/800M=0.5625, and a peak used bandwidth rate of the PE 1 is 700M/800M=0.875. An average used bandwidth rate of the PE 2 is 400M/1500M=0.27, and a peak used bandwidth rate of the PE 2 is 800M/1500M=0.53. The weight of the average used bandwidth rate is 0.7, and the weight of the peak used bandwidth rate is 0.3. Therefore, it can be learned through calculation that a reference value of the PE 1 is 0.5675×0.7+0.875×0.3=0.66, and a reference value of the PE 2 is 0.27×0.7+0.53×0.3=0.35. Therefore, the PE 2 is elected as a DF for two VLANs in the three VLANs, and the PE 1 is elected as a DF for the remaining one VLAN.

Alternatively, the PE 2 may be elected as a DF for two VLANs in the three VLANs, some BUM traffic of the remaining one VLAN is forwarded by the PE 1, and the other BUM traffic of the remaining one VLAN is forwarded by the PE 2.

A ratio between quantities of VLANs or EVPN instances for which PEs elected as DFs are separately used may be further determined based on a ratio between the reference values of the other PE and the first PE. For example, an opposite number of a ratio between reference values of the PEs may be determined as the ratio between the quantities of VLANs or EVPN instances for which the PEs elected as the DFs are separately used. Alternatively, an approximation value of an opposite number of a ratio between reference values of the PEs may be determined as the ratio between the quantities of VLANs or EVPN instances for which the PEs elected as the DFs are separately used.

For example, a DF for a VLAN 1, a VLAN 2, and a VLAN 3 is elected from the PE 1 and the PE 2. The PE 1 receives a bandwidth notification message from the PE 2, a link bandwidth of the PE 2 is 1500M, an average used bandwidth of the PE 2 is 400M, and a peak used bandwidth of the PE 2 is 800M. In bandwidth information of the PE 1, a link bandwidth is 800M, an average used bandwidth is 450M, and a peak used bandwidth is 700M. It can be learned that an average used bandwidth rate of the PE 1 is 450M/800M=0.5625, and a peak used bandwidth rate of the PE 1 is 700M/800M=0.875. An average used bandwidth rate of the PE 2 is 400M/1500M=0.27, and a peak used bandwidth rate of the PE 2 is 800M/1500M=0.53. The weight of the average used bandwidth rate is 0.7, and the weight of the peak used bandwidth rate is 0.3. Therefore, it can be learned through calculation that a reference value of the PE 1 is 0.5675×0.7+0.875×0.3=0.66, and a reference value of the PE 2 is 0.27×0.7+0.53×0.3=0.35. A ratio of the reference value of the PE 1 to the reference value of the PE 2 is approximately 2:1, and therefore a ratio between quantities of VLANs that the PE 1 and the PE 2 separately serve may be 1:2. That is, the PE 2 is elected as a DF for two VLANs in the three VLANs, and the PE 1 is elected as a DF for the remaining one VLAN.

Based on the foregoing method 1 to method 8, a DF may be elected from PEs to forward BUM traffic of a remote CE. In a possible implementation, a DF may be re-elected when any one or more of the following conditions 1 to 5 are met. For a specific DF election method, refer to the foregoing method 1 to method 8. Repeated content is not described herein again.

Condition 1: A peak used bandwidth of the elected DF is greater than or equal to a first threshold.

The first threshold herein may be determined in advance based on an empirical value. For example, the first threshold may be 700M, or 75% of a link bandwidth. This is not limited in this disclosure.

For example, the PE 1 and the PE 2 are connected to the CE 1, the PE 1 is a DF for the EVPN 1, and the PE 2 is a DF for the EVPN 2. Because the peak used bandwidth of the PE 1 is 880M, which is greater than the first threshold 700M, a DF for the EVPN 1 and the EVPN 2 needs to be re-elected.

Condition 2: A peak used bandwidth rate of the elected DF is greater than or equal to a second threshold.

The second threshold herein may be determined in advance based on an empirical value. For example, the second threshold may be 0.8. This is not limited in this disclosure.

For example, the PE 1 and the PE 2 are connected to the CE 1. The PE 1 is a DF for the VLAN 1 and the VLAN 2. The link bandwidth of the PE 1 is 900M, and the peak used bandwidth of the PE 1 reaches 700M. It can be learned that the peak used bandwidth rate of the PE 1 is 700M/900M=0.78, which is greater than the second threshold 0.7. Therefore, a DF for the VLAN 1 and the VLAN 2 needs to be re-elected.

Condition 3: An average available bandwidth or a minimum available bandwidth of the elected DF is less than or equal to a fourth threshold.

A fourth threshold of the average available bandwidth may be the same as or different from a fourth threshold of the minimum available bandwidth. For example, the fourth threshold of the average available bandwidth may be 800M, and the fourth threshold of the minimum available bandwidth may be 500M, or both the fourth threshold of the average available bandwidth and the fourth threshold of the minimum available bandwidth may be 500M.

For example, the PE 1 and the PE 2 are connected to the CE 1. The PE 1 is a DF for the VLAN 1, and the PE 2 is a DF for the VLAN 1 and the VLAN 2. Because the average available bandwidth of the PE 2 is 400M, which is less than the fourth threshold 500M, a DF for the VLAN 1, the VLAN 2, and the VLAN 3 needs to be re-elected.

Condition 4: An average available bandwidth rate or a minimum available bandwidth rate of the elected DF is less than or equal to a third threshold.

A third threshold of the average available bandwidth rate may be the same as or different from a third threshold of the minimum available bandwidth rate.

For example, the PE 1 and the PE 2 are connected to the CE 1. The PE 1 is a DF for the VLAN 1, and the PE 2 is a DF for the VLAN 1 and the VLAN 2. Because the minimum available bandwidth of the PE 2 is 100M, and the link bandwidth of the PE 2 is 500M, the average available bandwidth rate of the PE 2 is 100M/500M=0.2, which is less than the third threshold 0.5. Therefore, a DF for the VLAN 1, the VLAN 2, and the VLAN 3 needs to be re-elected.

Condition 5: A preset cycle is reached.

The preset cycle herein may be determined in advance based on an empirical value. For example, the preset cycle may be 1 minute (min), 3 min, or 5 hour (h). This is not limited in this disclosure.

It should be noted that the preset cycle herein may be the same as the cycle in the bandwidth notification message, or may be longer than the cycle in the bandwidth notification message. If the preset cycle is the same as the cycle in the bandwidth notification message, bandwidth information in a bandwidth notification message in a current cycle may be used when a DF is re-elected. If the preset cycle is longer than the cycle in the bandwidth information, bandwidth information in a latest bandwidth notification message may be used when a DF is re-elected, or bandwidth information in all bandwidth notification messages received in the preset cycle may be used for DF election.

A punishment threshold is further introduced in this embodiment of this disclosure. The punishment threshold may be determined in advance based on an empirical value. For example, the punishment threshold may be 5 or 6. This is not limited in this disclosure.

In this embodiment of this disclosure, a DF on a link on which the DF is located is re-elected in each preset cycle or when a used bandwidth of the DF is greater than or equal to a preset bandwidth threshold. Each time a DF is elected, a DF election punishment value increases by a preset value. For example, the preset value may be 1 or 2. The DF election punishment value increases with a quantity of DF election times and is negatively correlated with time. For example, if a quantity of DF election times within 1 h is 4, the DF election punishment value is 4. The DF election punishment value decreases by a preset value every preset period. For example, the DF election punishment value decreases by 1 every 2 h. That is, the DF election punishment value is 3 after 2 h, the DF election punishment value is 2 after 4 h, and so on. Finally, when the DF election punishment value is 0, the DF election punishment value stops decreasing.

In a possible implementation, if the DF election punishment value is greater than or equal to the punishment threshold, DF election is stopped. If the DF election punishment value is less than the punishment threshold, DF election is resumed.

For example, if a quantity of DF election times within 1 h is 5, which is equal to the punishment threshold, DF election is stopped. In this case, when the used bandwidth of the DF is greater than or equal to the preset bandwidth threshold, a DF may not be re-elected. After 2 h, the DF election punishment value is 4. In this case, if the used bandwidth of the DF is greater than or equal to the preset bandwidth threshold, a DF may be re-elected. For a specific DF election method, refer to the foregoing method 1 to method 8. Details are not described herein again.

Figure 5:
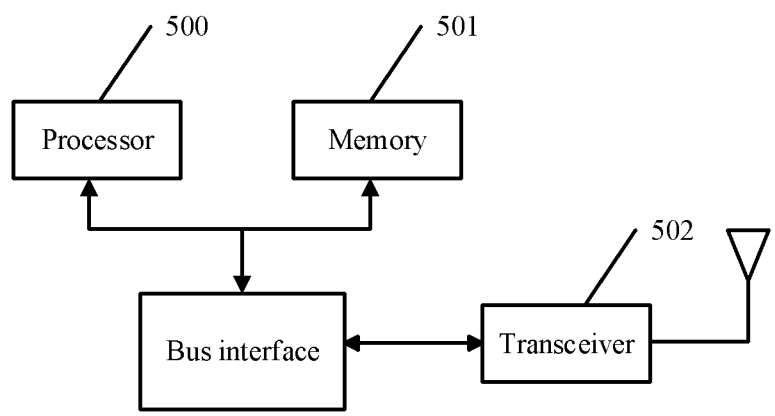
FIG. 5 is a schematic diagram of a DF election device according to this disclosure.
Figure 6:
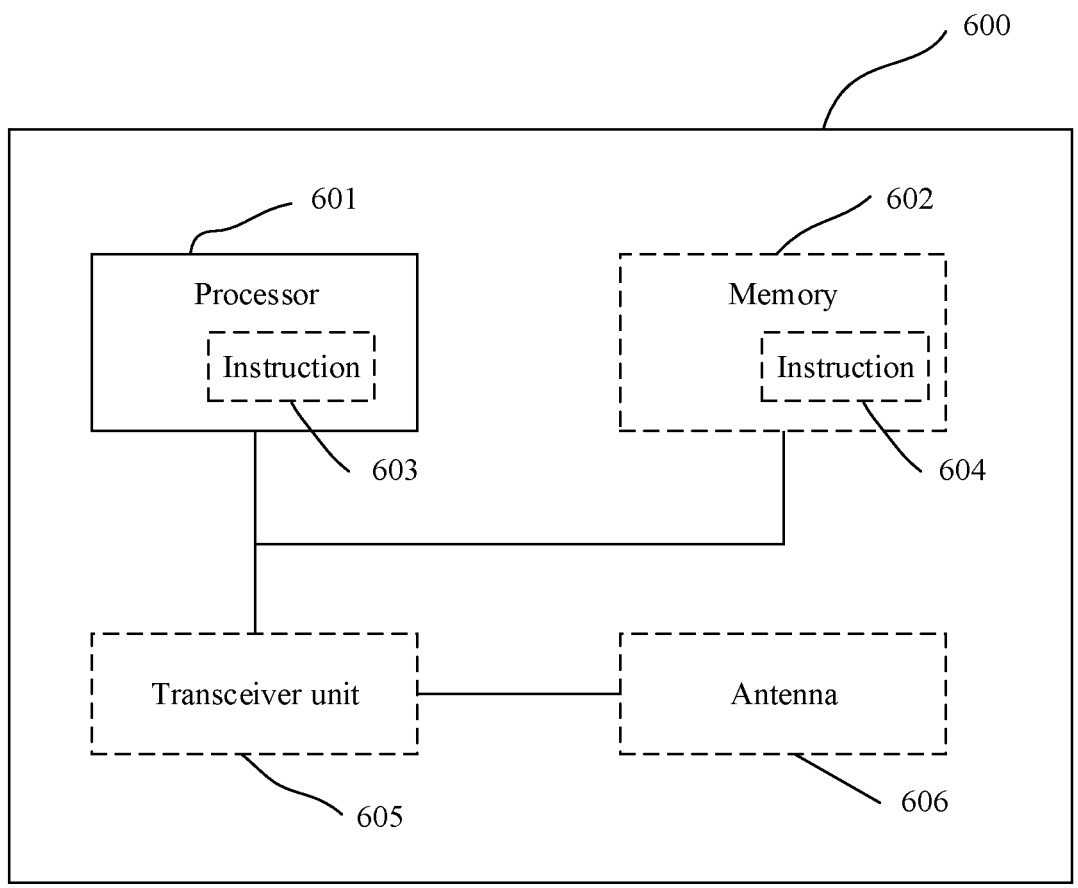
FIG. 6 is a schematic diagram of a DF election device according to this disclosure.

The foregoing describes the designated forwarder election method in embodiments of this disclosure by using FIG. 1 to FIG. 4, and the following describes a designated forwarder election device in embodiments of this disclosure by using FIG. 5 and FIG. 6.

As shown in FIG. 5, an embodiment of this disclosure further provides a designated forwarder election device, and the device includes a processor 500, a memory 501, and a transceiver 502.

The processor 500 is responsible for managing a bus architecture and general processing. The memory 501 may store data that is used by the processor 500 when the processor 500 performs an operation. The transceiver 502 is configured to receive and send data under control of the processor 500.

The bus architecture may include any quantity of interconnected buses and bridges. Various circuits of one or more processors represented by the processor 500 and various circuits of memories represented by the memory 501 are linked together. The bus architecture may further connect various other circuits such as a peripheral device, a voltage stabilizer, and a power management circuit. These are well known in the art, and therefore are not further described in this specification. The bus interface provides an interface.

A process disclosed in embodiments of the present disclosure may be applied to the processor 500, or implemented by the processor 500. In an implementation process, steps in a signal processing procedure may be performed by an integrated logic circuit of hardware in the processor 500, or by a software instruction. The processor 500 may be a general-purpose processor, a digital signal processor, an application-specific integrated circuit (ASIC), a field-programmable gate array (FPGA) or another programmable logic device, a discrete gate or transistor logic device, or a discrete hardware component, and is capable of implementing or executing the methods, steps, and logical block diagrams disclosed in embodiments of the present disclosure. The general-purpose processor may be a microprocessor, another processor, or the like. The steps of the method disclosed with reference to embodiments of the present disclosure may be directly performed by a hardware processor, or may be performed by using a combination of hardware in the processor and a software module. The software module may be located in a mature storage medium in the art, such as a random-access memory, a flash memory (RAM), a read-only memory (ROM), a programmable read-only memory (PROM), an electrically erasable programmable read-only memory (EEPROM), or a register. The storage medium is located in the memory 501, and the processor 500 reads information in the memory 501 and completes the steps of the designated forwarder election procedure in combination with hardware of the processor 500.

The transceiver 502 is configured to receive a bandwidth notification message sent by another provider edge PE, where the first PE and the other PE are connected to a first CE, and the bandwidth notification message includes bandwidth information of a link between the other PE and the first CE.

The processor 500 is configured to read a program in the memory 501 and perform the designated forwarder election method in embodiments of this disclosure. For example, the processor 500 may elect a designated forwarder DF from the first PE and the other PE based on the bandwidth information of the other PE and bandwidth information of a link between the first PE and the first CE.

FIG. 6 is a schematic diagram of a structure of a designated forwarder election device 600. The device 600 may be configured to implement the method described in the foregoing method embodiment. For details, refer to the description in the foregoing method embodiment. The device 600 may be a chip, a network device (for example, a base station), a terminal device, another network device, or the like.

The device 600 includes one or more processors 601. The processor 601 may be a general-purpose processor, an application-specific processor, or the like. For example, the processor 601 may be a baseband processor or a central processing unit. The baseband processor may be configured to process a communications protocol and communication data. The central processing unit may be configured to control the device (for example, a base station, a terminal, or a chip), execute a software program, and process data of the software program. The device may include a transceiver unit configured to input (receive) and output (send) signals. For example, the device may be a chip, and the transceiver unit may be an input and/or output circuit or a communications interface of the chip. The chip may be used for a terminal, a base station, or another network device. For another example, the device may be a terminal, a base station, or another network device, and the transceiver unit may be a transceiver, a radio frequency chip, or the like.

The device 600 includes one or more processors 601, and the one or more processors 601 may implement the method in the embodiment shown in FIG. 4.

In a possible design, the device 600 includes a means configured to elect a designated forwarder DF, and a means configured to receive a bandwidth notification message sent by another provider edge PE. One or more processors may be used to implement functions of the means for electing a designated forwarder DF and the means for receiving a bandwidth notification message sent by another provider edge PE. For example, a designated forwarder DF may be elected by using one or more processors, and a bandwidth notification message sent by another provider edge PE may be received by using a transceiver, an input/output circuit, or an interface of a chip. For the bandwidth notification message, refer to the related description in the foregoing method embodiment.

Optionally, the processor 601 may further implement another function in addition to the method in the embodiment shown in FIG. 4.

Optionally, in a design, the processor 601 may execute instructions, so that the device 600 performs the method described in the foregoing method embodiment. All or a part of the instructions, for example, an instruction 603, may be stored in the processor, or all or a part of the instructions, for example, an instruction 604, may be stored in a memory 602 coupled to the processor. Alternatively, the device 600 may be enabled, by using both the instructions 603 and 604, to perform the method described in the foregoing method embodiment.

In another possible design, the device 600 may alternatively include a circuit, and the circuit may implement the functions in the foregoing method embodiments.

In another possible design, the device 600 may include one or more memories 602. The one or more memories 602 store the instruction 604, and the instruction may be run on the processor, to enable the device 600 to perform the method described in the foregoing method embodiment. Optionally, the memory may further store data. Optionally, the processor may also store instructions and/or data. For example, the one or more memories 602 may store the route update message and the like described in the foregoing embodiments. The processor and the memory may be separately disposed, or may be integrated together.

In another possible design, the device 600 may further include a transceiver unit 605 and an antenna 606. The processor 601 may be referred to as a processing unit, and controls the device (a terminal or a base station). The transceiver unit 605 may be referred to as a transceiver machine, a transceiver circuit, a transceiver, or the like, and is configured to implement sending and receiving functions of the device by using the antenna 606.

It should be noted that, the processor in this embodiment of this disclosure may be an integrated circuit chip, and has a signal processing capability. In an implementation process, steps in the foregoing method embodiment may be completed by using an integrated logic circuit of hardware in the processor or by using an instruction in a form of software. The processor may be a general-purpose processor, a digital signal processor (DSP), an ASIC, an FPGA, or another programmable logic device, a discrete gate or a transistor logic device, or a discrete hardware component. The processor may implement or execute the methods, steps, and logical block diagrams disclosed in embodiments of this disclosure. The general-purpose processor may be a microprocessor, or the processor may be another processor or the like. The steps in the methods disclosed with reference to embodiments of this disclosure may be directly performed and completed by a hardware decoding processor, or may be performed and completed by using a combination of hardware in a decoding processor and a software module. The software module may be located in a mature storage medium in the art, such as a RAM, a flash memory, a ROM, a PROM, an EEPROM, or a register. The storage medium is located in the memory, and the processor reads information in the memory and completes the steps of the foregoing method in combination with hardware of the processor.

It may be understood that the memory in embodiments of this disclosure may be a volatile memory or a nonvolatile memory, or may include both a volatile memory and a nonvolatile memory. The nonvolatile memory may be a ROM, a PROM, an erasable programmable read-only memory (EPROM), an EEPROM, or a flash memory. The volatile memory may be a RAM that is used as an external cache. By way of example but not limitative description, RAMs in many forms may be used, for example, a static random-access memory (SRAM), a dynamic random access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct RAMBUS random-access memory (DR RAM). It should be noted that the memory in the system and the method described in this specification is intended to include but is not limited to these memories and any memory of another appropriate type.

An embodiment of this disclosure further provides a computer-readable medium. The computer-readable medium stores a computer program. When the computer program is executed by a computer, the designated forwarder election method in any one of the foregoing method embodiments is implemented.

An embodiment of this disclosure further provides a computer program product. When the computer program product is executed by a computer, the designated forwarder election method in any one of the foregoing method embodiments is implemented.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer instructions are loaded and executed on the computer, the procedures or functions according to embodiments of this disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

An embodiment of this disclosure further provides a designated forwarder election apparatus, including a processor and an interface. The processor is configured to perform the designated forwarder election method according to any one of the foregoing method embodiments.

It should be understood that the processing apparatus may be a chip. The processor may be implemented by using hardware, or may be implemented by using software. When implemented by using the hardware, the processor may be a logic circuit, an integrated circuit, or the like. When implemented by using the software, the processor may be a general-purpose processor, and is implemented by reading software code stored in a memory. The memory may be integrated into the processor, or may be located outside the processor and exist independently.

It should be understood that "one embodiment" or "an embodiment" mentioned in the entire specification means that particular features, structures, or characteristics related to embodiments are included in at least one embodiment of this disclosure. Therefore, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this disclosure. The execution sequences of the processes should be determined according to functions and internal logic of the processes, and should not be construed as any limitation on the implementation processes of embodiments of this disclosure.

In addition, the terms "system" and "network" are usually used interchangeably in this specification. The term "and/or" in this specification describes only an association relationship for associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that in embodiments of this disclosure, "B corresponding to A" indicates that B is associated with A, and B may be determined according to A. However, it should be further understood that determining B based on A does not mean that B is determined based on only A. B may alternatively be determined based on A and/or other information.

A person of ordinary skill in the art may be aware that, in combination with the examples described in the embodiments disclosed in this specification, units and algorithm steps can be implemented by electronic hardware, computer software, or a combination thereof. To clearly describe the interchangeability between the hardware and the software, the foregoing has generally described compositions and steps of the examples based on functions. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely illustrative. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in embodiments of this disclosure.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this disclosure may be implemented by hardware, firmware, or a combination thereof. When this disclosure is implemented by software, the functions may be stored in a computer-readable medium or transmitted as one or more instructions or code on the computer-readable medium. The computer-readable medium includes a computer storage medium and a communications medium. The communications medium includes any medium that enables a computer program to be transmitted from one place to another place. The storage medium may be any available medium accessible to a computer. The following provides an example but does not impose a limitation. The computer-readable medium may include a RAM, a ROM, an EEPROM, a CD-ROM or another compact disc storage, a magnetic disk storage medium or another magnetic storage device, or any other medium that can be used to carry or store expected program code in a form of instructions or a data structure and can be accessed by the computer. In addition, any connection may be appropriately referred to as a computer-readable medium. For example, if software is transmitted from a website, a server, or another remote source by using a coaxial cable, an optical fiber cable, a twisted pair, a DSL, or a wireless technology such as infrared, radio, and microwave, the coaxial cable, optical fiber cable, twisted pair, DSL, or wireless technology such as infrared, radio, and microwave is included in the definition of the medium. For example, a disk and a disc used in this disclosure include a compact disc (CD), a laser disc, an optical disc, a DVD, a floppy disk, and a BLU-RAY disc, where the disk generally copies data by a magnetic means, and the disc copies data optically by a laser means. The foregoing combination shall also be included in the protection scope of the computer-readable medium.

In summary, the foregoing description is merely example embodiments of the technical solutions of this disclosure, but is not intended to limit the protection scope of this disclosure. Any modification, equivalent replacement, or improvement made without departing from the principle of this disclosure shall fall within the protection scope of this disclosure.

What is claimed is:
1. A designated forwarder election method implemented by a first provider edge (PE), wherein the designated forwarder election method comprises:
   receiving a bandwidth notification message from a second PE, wherein the first PE and the second PE are connected to a first customer edge (CE), and wherein the bandwidth notification message comprises first bandwidth information of a first link between the second PE and the first CE; and electing, based on the first bandwidth information and second bandwidth information of a second link between the first PE and the first CE, a first designated forwarder (DF) from the first PE and the second PE, wherein electing the first DF further comprises:

electing, based on a largest available bandwidth or a highest available bandwidth rate from the first PE and the second PE, the first PE or the second PE as the first DE, wherein the largest available bandwidth and the highest available bandwidth rate are determined based on the first bandwidth information and the second bandwidth information;

electing, based on a lowest used bandwidth rate from the first PE and the second PE, the first PE or the second PE as the first DF, wherein the lowest used bandwidth rate is determined based on the first bandwidth information and the second bandwidth information;

electing, based on available bandwidths or available bandwidth rates of the first PE and the second PE, the first PE or the second PE as a second DF used for different virtual local area networks (VLANs) or different Ethernet virtual private network (EVPN) instances, wherein the available bandwidths and the available bandwidth rates are determined based on the first bandwidth information and the second bandwidth information, and wherein a larger available bandwidth or a higher available bandwidth rate is used for a larger quantity of VLANs or EVPN instances; or electing, based on used bandwidth rates of the first PE and the second PE, the first PE or the second PE as the second DF used for the different VLANs or the different EVPN instances, wherein the used bandwidth rates are determined based on the first bandwidth information and the second bandwidth information, and wherein a lower used bandwidth rate is used for a larger quantity of VLANs or EVPN instances, and wherein electing, based on the available bandwidths or the available bandwidth rates, the first PE or the second PE as the second DF comprises determining, based on a first ratio between the available bandwidths or the available bandwidth rates of the first PE and the second PE, a second ratio between quantities of VLANs or EVPN instances for which PEs elected as DFs are separately used, or wherein electing, based on the used bandwidth rates of the first PE and the second PE, the first PE or the second PE as the second DF used for the different VLANs or the different EVPN instances comprises determining, based on a third ratio between the used bandwidth rates of the first PE and the second PE, a fourth ratio between quantities of VLANs or EVPN instances for which PEs elected as DFs are separately used.

2. The designated forwarder election method of claim 1, wherein the available bandwidths comprise an average available bandwidth or a minimum available bandwidth.

3. The designated forwarder election method of claim 1, wherein the available bandwidth rates comprise an average available bandwidth rate or a minimum available bandwidth rate.

4. The designated forwarder election method of claim 1, wherein the used bandwidth rates comprise an average used bandwidth rate or a peak used bandwidth rate.

5. The designated forwarder election method of claim 1, wherein the bandwidth notification message is a route update message.

6. The designated forwarder election method of claim 1, wherein the first bandwidth information and the second bandwidth information comprise a part or all of a link bandwidth, an average used bandwidth, or a peak used bandwidth.

7. The designated forwarder election method of claim 1, wherein after electing the first DF, the designated forwarder election method further comprises:

re-electing the first DF when a peak used bandwidth of the first DF is greater than or equal to a first threshold;

re-electing the first DF in each preset cycle;

re-electing the first DF when a peak used bandwidth rate of the first DF is greater than or equal to a second threshold;

re-electing the first DF when an available bandwidth rate of the first DF is less than or equal to a third threshold; or re-electing the first DF when an available bandwidth of the first DF is less than or equal to a fourth threshold.

8. The designated forwarder election method of claim 1, further comprising:

stopping DF election when a DF election punishment value is greater than or equal to a punishment threshold, wherein the DF election punishment value is positively correlated with a quantity of DF election times and is negatively correlated with time; or resuming the DF election when the DF election punishment value is less than the punishment threshold.

9. A designated forwarder election device, comprising:

a memory configured to store instructions; and a processor coupled to the memory and configured to execute the instructions to cause the designated forwarder election device to:

receive a bandwidth notification message from a first provider edge (PE), wherein the first PE and a second PE are connected to a first customer edge (CE), and wherein the bandwidth notification message comprises first bandwidth information of a first link between the second PE and the first CE;

elect, based on the first bandwidth information and second bandwidth information of a second link between the first PE and the first CE, a first designated forwarder (DF) from the first PE and the second PE, elect, based on a largest available bandwidth or a highest available bandwidth rate from the first PE and the second PE, the first PE or the second PE as the first DE, wherein the largest available bandwidth and the highest available bandwidth rate are determined based on the first bandwidth information and the second bandwidth information;

elect, based on a lowest used bandwidth rate from the first PE and the second PE, the first PE or the second PE as the first DF, wherein the lowest used bandwidth rate is determined based on the first bandwidth information and the second bandwidth information;

elect, based on available bandwidths or available bandwidth rates of the first PE and the second PE, the first PE or the second PE as a second DF used for different virtual local area networks (VLANs) or different Ethernet virtual private network (EVPN)

instances, wherein the available bandwidths and the available bandwidth rates are determined based on the first bandwidth information and the second bandwidth information, and wherein a larger available bandwidth or a higher available bandwidth rate is used for a larger quantity of VLANs or EVPNs; or elect, based on used bandwidth rates of the first PE and the second PE, the first PE or the second PE as the second DF used for the different VLANs or the different EVPN instances, wherein the used bandwidth rates are determined based on the first bandwidth information and the second bandwidth information, and wherein a lower used bandwidth rate is used for a larger quantity of VLANs or EVPN instances; and determine, based on a first ratio between the available bandwidths or the available bandwidth rates, a second ratio between quantities of VLANs or EVPN instances for which PEs elected as DFs are separately used; or determine, based on a third ratio between the used bandwidth rates of the second PE, a fourth ratio between quantities of VLANs or EVPN instances for which PEs elected as DFs are separately used.

10. The designated forwarder election device of claim 9, wherein the available bandwidths comprise:
an average available bandwidth;
a minimum available bandwidth;
an average available bandwidth rate;
a minimum available bandwidth rate;
an average used bandwidth rate; or
a peak used bandwidth rate.

11. The designated forwarder election device of claim 9, wherein the bandwidth notification message is a route update message.

12. The designated forwarder election device of claim 9, wherein the first bandwidth information and the second bandwidth information comprise a link bandwidth, an average used bandwidth, or a peak used bandwidth.

13. The designated forwarder election device of claim 9, wherein after electing the first DF, the instructions further cause the designated forwarder election device to:
re-elect the first DF when a peak used bandwidth of the first DF is greater than or equal to a first threshold;
re-elect the first DF in each preset cycle;
re-elect the first DF when a peak used bandwidth rate of the first DF is greater than or equal to a second threshold;
re-elect the first DF when an available bandwidth rate of the first DF is less than or equal to a third threshold; or
re-elect the first DF when an available bandwidth of the first DF is less than or equal to a fourth threshold.

14. The designated forwarder election device of claim 9, wherein the instructions further cause the designated forwarder election device to:
stop DF election when a DF election punishment value is greater than or equal to a punishment threshold, wherein the DF election punishment value is positively correlated with a quantity of DF election times and is negatively correlated with time; or
resume the DF election when the DF election punishment value is less than the punishment threshold.

15. The designated forwarder election device of claim 9, wherein the designated forwarder election device is a chip.

16. A computer program product comprising instructions stored on a non-transitory computer-readable medium that, when executed by a processor, cause a first provider edge (PE) to:
receive a bandwidth notification message from a second PE, wherein the first PE and the second PE are connected to a first customer edge (CE), and wherein the bandwidth notification message comprises first bandwidth information of a link between the second PE and the first CE;
elect, based on the first bandwidth information and second bandwidth information of a second link between the first PE and the first CE, a first designated forwarder (DF) from the first PE and the second PE;
elect, based on a largest available bandwidth or a highest available bandwidth rate from the first PE and the second PE, the first PE or the second PE as the first DE, wherein the largest available bandwidth and the highest available bandwidth rate are determined based on the first bandwidth information and the second bandwidth information;
elect, based on a lowest used bandwidth rate from the first PE and the second PE, the first PE or the second PE as the first DE, wherein the lowest used bandwidth rate is determined based on the first bandwidth information and the second bandwidth information;
elect, based on available bandwidths or available bandwidth rates of the first PE and the second PE, the first PE or the second PE as a second DF used for different virtual local area networks (VLANs) or different Ethernet virtual private network (EVPN) instances, wherein the available bandwidths and the available bandwidth rates are determined based on the first bandwidth information and the second bandwidth information, and wherein a larger available bandwidth or a higher available bandwidth rate is used for a larger quantity of VLANs or EVPNs; or elect, based on used bandwidth rates of the first PE and the second PE, the first PE or the second PE as the second DF used for the different VLANs or the different EVPN instances, wherein the used bandwidth rates are determined based on the first bandwidth information and the second bandwidth information, and wherein a lower used bandwidth rate is used for a larger quantity of VLANs or EVPN instances; and
determine, based on a first ratio between the available bandwidths or the available bandwidth rates, a second ratio between quantities of VLANs or EVPN instances for which PEs elected as DFs are separately used; or determine, based on a third ratio between the used bandwidth rates of the second PE, a fourth ratio between quantities of VLANs or EVPN instances for which PEs elected as DFs are separately used.

* * * * *

UNITED STATES PATENT AND TRADEMARK OFFICE
CERTIFICATE OF CORRECTION

PATENT NO. : 12,273,800 B2
APPLICATION NO. : 17/892307
DATED : April 8, 2025
INVENTOR(S) : Fei Xing Page 1 of 1

It is certified that error appears in the above-identified patent and that said Letters Patent is hereby corrected as shown below:

In the Claims

Claim 9, Column 30, Line 54: "the first DE, wherein" should read "the first DF, wherein"

Claim 16, Column 32, Line 29: "the first DE, wherein" should read "the first DF, wherein"

Signed and Sealed this
Twentieth Day of May, 2025

Coke Morgan Stewart
*Acting Director of the United States Patent and Trademark Office*